United States Patent
Tanaka et al.

(10) Patent No.: US 8,848,501 B2
(45) Date of Patent: Sep. 30, 2014

(54) DETECTION LENS, LENS UNIT, OPTICAL PICKUP DEVICE, OPTICAL DISC DEVICE, COMPUTER, OPTICAL DISC PLAYER AND OPTICAL DISC RECORDER

(71) Applicant: Panasonic Corporation, Osaka (JP)

(72) Inventors: Toshiyasu Tanaka, Osaka (JP); Noriaki Terahara, Osaka (JP); Takeshi Ohta, Osaka (JP); Shinsuke Hatanaka, Osaka (JP); Fumitomo Yamasaki, Nara (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/997,380

(22) PCT Filed: Dec. 20, 2012

(86) PCT No.: PCT/JP2012/008171
§ 371 (c)(1),
(2), (4) Date: Jun. 24, 2013

(87) PCT Pub. No.: WO2013/094210
PCT Pub. Date: Jun. 27, 2013

(65) Prior Publication Data
US 2014/0078877 A1    Mar. 20, 2014

(30) Foreign Application Priority Data
Dec. 22, 2011    (JP) .................. 2011-282146

(51) Int. Cl.
| | | |
|---|---|---|
| *G11B 7/00* | (2006.01) | |
| *G11B 7/1378* | (2012.01) | |
| *G11B 7/12* | (2012.01) | |
| *G02B 13/18* | (2006.01) | |
| *G02B 7/02* | (2006.01) | |
| *G11B 7/1372* | (2012.01) | |
| *G11B 7/22* | (2006.01) | |

(52) U.S. Cl.
CPC ............... *G02B 7/02* (2013.01); *G11B 7/1378* (2013.01); *G11B 7/1205* (2013.01); *G02B 13/18* (2013.01); *G11B 7/1372* (2013.01); *G02B 7/025* (2013.01); *G11B 7/22* (2013.01)
USPC ....... 369/112.25; 359/811; 359/719; 359/819

(58) Field of Classification Search
None
See application file for complete search history.

(56) References Cited

U.S. PATENT DOCUMENTS

| | | |
|---|---|---|
| 2003/0095344 A1 | 5/2003 | Ito et al. |
| 2011/0122514 A1 | 5/2011 | Kano et al. |
| 2011/0299377 A1* | 12/2011 | Hanashiro et al. ....... 369/112.23 |

FOREIGN PATENT DOCUMENTS

| | | |
|---|---|---|
| JP | 61-258336 | 11/1986 |
| JP | 2003-121716 | 4/2003 |
| JP | 2003-156601 | 5/2003 |
| JP | 2006-059421 | 3/2006 |
| JP | 2007-080318 | 3/2007 |
| JP | 2009-266264 | 11/2009 |
| JP | 2011-108350 | 6/2011 |

OTHER PUBLICATIONS

International Search Report issued Mar. 12, 2013 in International (PCT) Application No. PCT/JP2012/008171.

* cited by examiner

*Primary Examiner* — Brenda Bernardi
(74) *Attorney, Agent, or Firm* — Wenderoth Lind & Ponack, L.L.P.

(57) ABSTRACT

The present application discloses detection lens provided with lens portion and flange portion including first surface connected to lens portion and second surface opposite to first surface. Flange portion includes base along optical axis of lens portion, and first to fourth projections projecting from base. First and second projections are point-symmetric around optical axis. Third and fourth projections are point- (FRONT VIEW)

symmetric around optical axis. Flange portion excludes projection extending beyond second surface. First projection includes first intersecting surface which intersects with first axis. Second projection includes second intersecting surface which intersects with first axis. Third projection includes third intersecting surface which intersects with second axis. Fourth projection includes fourth intersecting surface which intersects with second axis. First distance between first and second intersecting surfaces is longer than second distance between third and fourth intersecting surfaces.

18 Claims, 21 Drawing Sheets

(FRONT VIEW)

(SIDE VIEW)

(PLAN VIEW)

(FRONT VIEW)

(PLAN VIEW)

(FRONT VIEW)

(CROSS-SECTIONAL VIEW ALONG LINE B-B)

(CROSS-SECTIONAL VIEW ALONG LINE A-A)

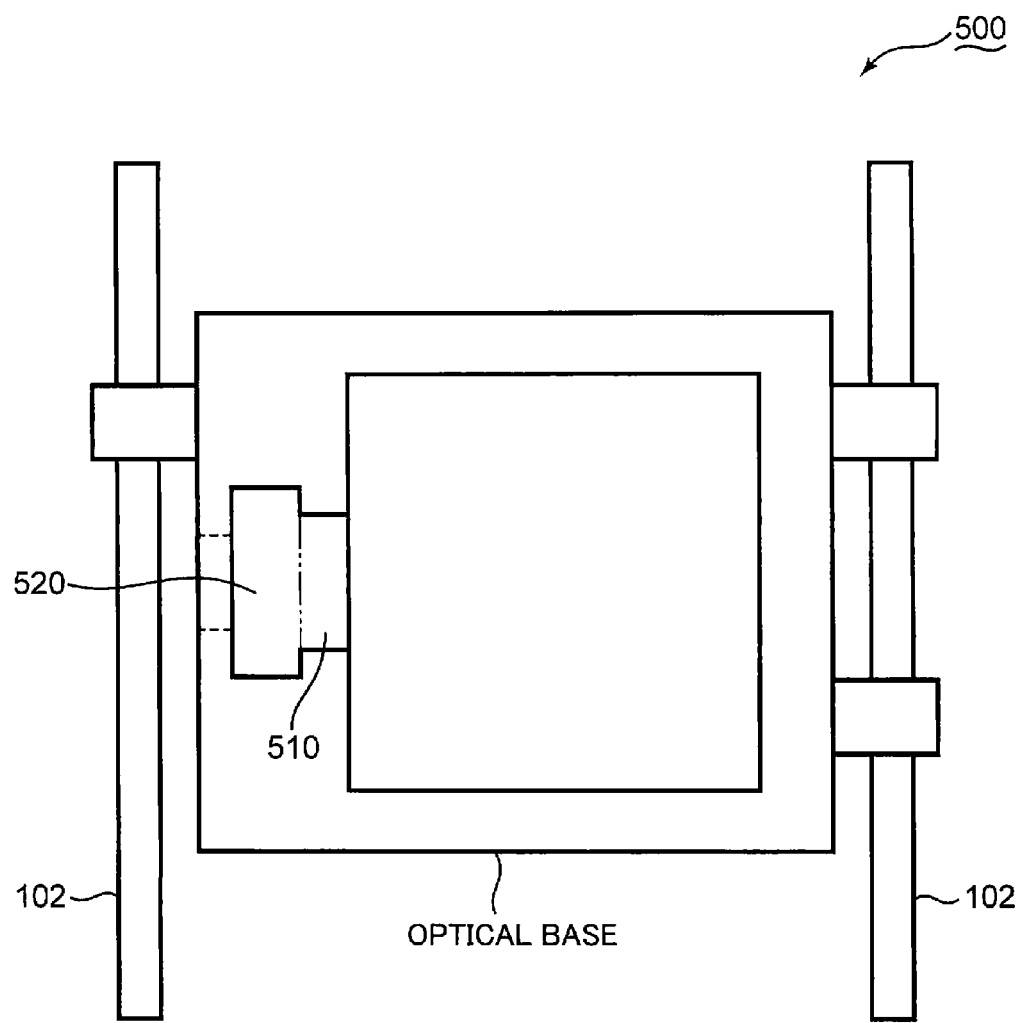

(PLAN VIEW)

(FRONT VIEW)

(CROSS-SECTIONAL VIEW ALONG LINE B-B)

(CROSS-SECTIONAL VIEW ALONG LINE A-A)

(FRONT VIEW)

(CROSS-SECTIONAL VIEW ALONG LINE C-C)

(FRONT VIEW)

(CROSS-SECTIONAL VIEW ALONG LINE C-C)

(PLAN VIEW)

(FRONT VIEW)

(FRONT VIEW)

(PLAN VIEW)

(PLAN VIEW)

(PLAN VIEW)

(PLAN VIEW)

(FRONT VIEW)

DETECTION LENS, LENS UNIT, OPTICAL PICKUP DEVICE, OPTICAL DISC DEVICE, COMPUTER, OPTICAL DISC PLAYER AND OPTICAL DISC RECORDER

TECHNICAL FIELD

The present invention relates to technologies of an information processing device configured to execute information processes using light.

BACKGROUND ART

Recently, blue-violet semiconductor lasers have been practical. The blue-violet semiconductor laser contributes to practical application of a blue-ray disc (referred to as "BD" hereinafter). Although BDs is as big as compact discs (CDs) and DVDs, BDs may have capacities large enough to store information at a higher density than the CDs and DVDs.

A BD is an optical disc with a protective substrate which is approximately 0.1 mm in thickness. With a light source, which emits a blue-violet laser beam having a wavelength of approximately 400 nm, and an objective lens having a numerical aperture (NA) up to "0.85", information may be recorded and/or reproduced in/from the BD.

Under such circumstances, it has been proposed to record or reproduce information with a compatible optical pickup device, which uses one or more objective lenses to focus different light beams in wavelength onto information recording surfaces of plural optical discs that have different protective substrates in thickness.

Very accurate positional adjustment to optical elements such as optical lenses for the information process (reproducing or recording information) by using BDs is required although there are attempts of size, weight and cost reduction for the aforementioned information processing technologies with light. In addition, there are needs for optical elements which allow easy installation to optical pickup devices. Furthermore, because the size reduction makes optical elements less visible and is likely to cause erroneous assembly of optical elements, there are requirements for technologies to prevent the erroneous assembly.

Patent Document 1 (JP 2011-108350 A) discloses a lens fixing device which has a lens holder and a mount to which the lens holder is mounted.

FIG. 21 is a schematic front view of the lens holder 900 disclosed in Patent Document 1. The conventional lens holder 900 is described with reference to FIG. 21.

The lens holder 900 includes a base 910, in which a tens region 901 is formed, a first projection 920, which projects from the base 910, and a second projection 930, which projects from the base 910 like the first projection 920. The lens holder 900 with the lens region 901 is integrally molded by resin molding techniques.

The first projection 920 includes a guide surface 921 inclined with respect to the y-axis, and a gluing surface 922 on the x-axis. The second projection 930 includes a guide surface 931 inclined with respect to the y-axis, and a gluing surface 932 on the x-axis. The extended surface of the guide surfaces 921, 931 intersects with the extended surface of the gluing surfaces 922, 932 at the optical axis OA of the lens region 901.

The mount (not shown) onto which the lens holder 900 is mounted includes a receiving surface with which the guide surfaces 921, 931 come into contact. When the guide surfaces 921, 931 come into contact with the receiving surface, the lens holder 900 is positioned in the X-Y plane. The lens holder 900 may determine a single rotational direction around the optical axis of the lens region 901. According to Patent Document 1, the shape of the lens holder 900 simplifies work for fixing the lens and causes little misalignment of the optical axis of the lens which is caused by a change in temperature of the lens.

Patent Document 2 (JP 2003-156601 A) discloses other technologies about positioning of a lens. It should be noted that small optical lenses disclosed in Patent Document 2 are not applicable to optical pickup devices.

FIGS. 22A and 22B are schematic front views of lenses 940, 950 disclosed in Patent Document 2. The conventional lenses 940, 950 are described with reference to FIGS. 22A and 22B.

The lens 940 shown in FIG. 22A includes a lens portion 941 and a rectangular flange 942 surrounding the lens portion 941. The flange 942 includes a left surface 943 on the left of the lens portion 941 and a right surface 944 on the right of the lens portion 941.

The lens 950 shown in FIG. 22B includes a lens portion 951 and a hexagonal flange 952 surrounding the lens portion 951. The flange 952 includes a left surface 953 on the left of the lens portion 951 and a right surface 954 on the right of the lens portion 951.

The lenses 940, 950 have the flanges 942, 952, respectively, which have polygonal outlines. The left surfaces 943, 953 and the right surfaces 944, 954 are flat and longer than diameters of the lens portions 941, 951. The geometric characteristics of the flanges 942, 952 makes the lenses 940, 950 easily mounted and positioned in holders such as lens barrels. The flat left surfaces 943, 953 and the flat right surfaces 944, 954 are used for preventing the lens portions 941, 951 from being rotated with respect to holders such as lens barrels when the lenses 940, 950 are mounted into the holders.

Patent Document 3 (JP 2003-121716 A) discloses other technologies about positioning of a lens.

FIG. 23A shows a schematic front view and a schematic side view of a lens 960 disclosed in Patent Document 3. FIG. 23B shows a schematic front view and a schematic side view of a lens 970 disclosed in Patent Document 3. The lenses 960, 970 are described with reference to FIGS. 23A and 23B.

The lens 960 shown in FIG. 23A includes a lens portion 961 and a flange 962 surrounding the lens portion 961. The flange 962 is formed by cutting a part of a circular flange material surrounding the lens portion 961. Therefore, the flange 962 includes an arch contour portion 963 and a straight contour portion 964. The outline of the flange 962 is generally D-shaped.

The lens 970 shown in FIG. 23B includes a lens portion 971 and a flange 972 surrounding the lens portion 971. The flange 972 is formed by cutting a part of a circular flange material surrounding the lens portion 971 in the thickness direction. Therefore, the flange 972 includes an arch contour portion 973 and a straight contour portion 974. The flange 972 partially has a D-shaped contour.

The shapes of the flanges 962, 972 shown in FIGS. 23A and 23B contribute to improvement of accuracy and degree of freedom about positioning of the lenses. In particular, because the flanges 962, 972 allow positioning in a rotational direction, geometry of the flanges 962, 972 is advantageous if positioning is required in a rotational direction.

Patent Document 4 (JP 2009-266264 A) discloses an optical pickup device. The optical pickup device of Patent Document 4 includes a lens holder, which holds a detection lens, and an optical base, which receives the lens holder. The lens holder has a main body for holding the lens, and a bulging portion which is shifted in one direction from the center of the detection lens. The bulging portion bulges from the main body in a direction orthogonal to a direction of the optical axis of the detection lens. An abutting portion is formed in the bulging portion to come into line contact with a receiving surface of the optical base. The receiving surface and the abutting portion may come into line contact with each other in a direction parallel to the optical axis. The technologies disclosed in Patent Document 4 may precisely adjust the position of the detection lens.

With respect to the lenses described in Patent Documents 1 and 4, when the lens is fabricated separately from the lens holder, a clearance has to be created in the lens holder so that the lens may be inserted into the holder. Generally, a lens is bonded to a lens holder. Therefore, the clearance makes the lens position unstable under a temperature change. In addition, processes are required to attach the lens to the lens holder.

If the lens is integrally resin-molded with the lens holder, these problems may be solved. However, according to the technologies disclosed in Patent Documents 1 and 4, the outer shape of the lens is so complicated and asymmetric in the vertical and horizontal directions that performance of the lens after molding degrades. Poor separation from a mold in the lens molding process may be another problem.

The shape of the lens disclosed in Patent Document 2 does not contribute to setting a single rotational direction of the lens around the optical axis. On the other hand, the shape of the lens described in Patent Document 3 enables to set a single rotational direction of the lens around the optical axis. However, the smaller the lens is, the less visible the cutout part is. Because of the small cutout part, even when an operator inserts the lens in a wrong direction, it is difficult for the operator to notice such erroneous operation.

Patent Document 1: JP 2011-108350 A
Patent Document 2: JP 2003-156601 A
Patent Document 3: JP 2003-121716 A
Patent Document 4: JP 2009-266264 A

SUMMARY OF THE INVENTION

The present invention relates to technologies which make lens assembly easy and accurate.

A detection lens according to one aspect of the present invention has a lens portion, and a flange portion including a first surface, to which the lens portion is connected, and a second surface opposite to the first surface. The flange portion includes a base disposed along an optical axis of the lens portion, a first projection, which projects along a first axis orthogonal to the optical axis, a second projection, which is point-symmetric to the first projection around the optical axis and projects from the base, a third projection which projects along a second axis orthogonal to the optical axis and the first axis, and a fourth projection, which is point-symmetric to the third projection around the optical axis and projects from the base. The flange portion does not have a projection which extends beyond the second surface. The first projection includes a first intersecting surface which intersects with the first axis. The second projection includes a second intersecting surface which intersects with the first axis. The third projection includes a third intersecting surface which intersects with the second axis. The fourth projection includes a fourth intersecting surface which intersects with the second axis. A first distance between the first and second intersecting surfaces is longer than a second distance between the third and fourth intersecting surfaces.

The present invention may make lens assembly easy and accurate.

Objects, features and advantages of the present invention will become more apparent from the following detailed description thereof taken with the accompanying drawings.

BRIEF DESCRIPTION OF THE DRAWINGS

FIG. 6 is a schematic plan view of the lens holder shown in FIG. 3A.

DESCRIPTION OF THE PREFERRED EMBODIMENTS

Figure 1:
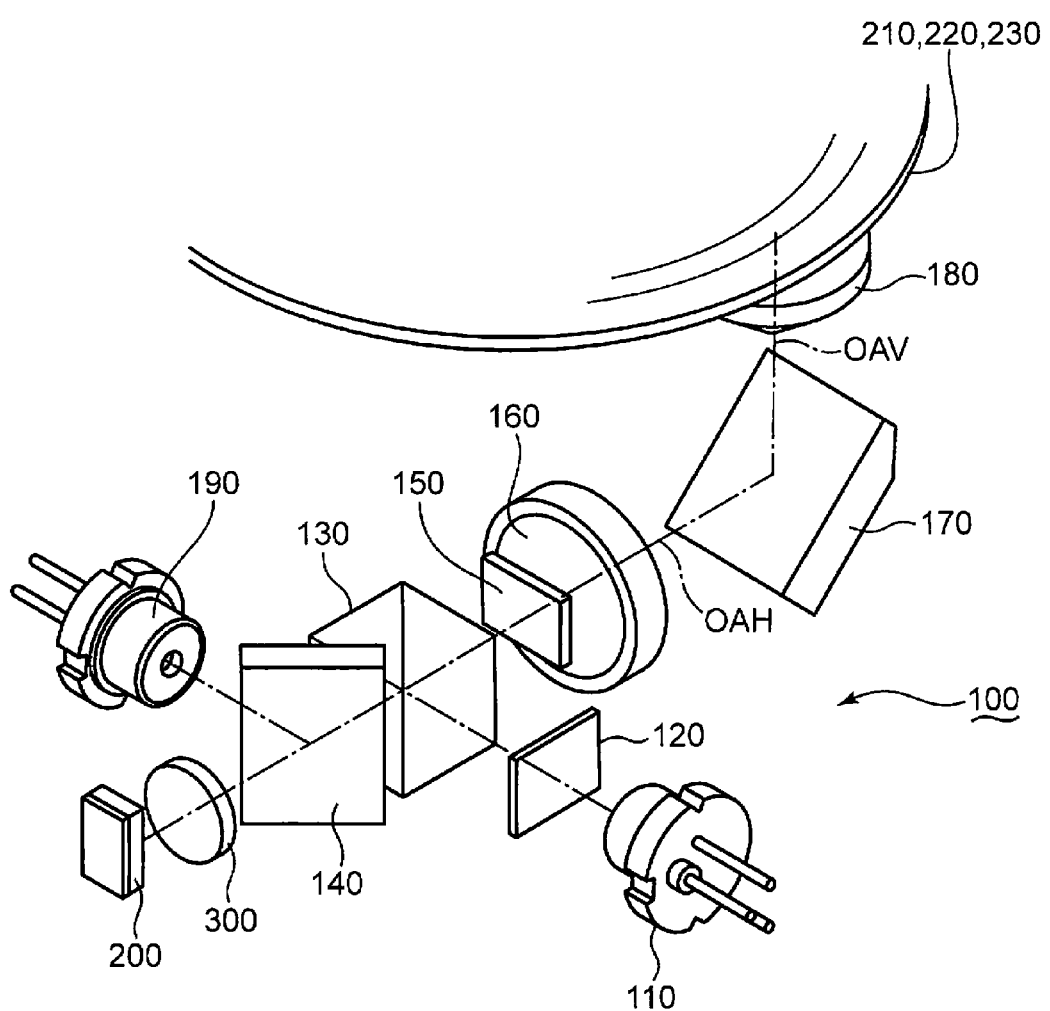
FIG. 1 is a schematic perspective view of an exemplary optical pickup device.

Various devices performing optical information processes and various optical parts incorporated in the devices are described with reference to the drawings. In various embodiments described hereinafter, the same reference characters are used to describe the same components. Also, for the purpose of clarifying the concepts of the devices and parts, redundant descriptions are omitted as appropriate. Configurations, arrangements and shapes shown in the drawings and descriptions associated with the diagrams aim to make principles of the embodiments easily understood. Therefore, the principles of the embodiments are not limited thereto.

First Embodiment

Optical Pickup Device

FIG. 1 is a schematic perspective view of an optical pickup device 100. The optical pickup device 100 is described with reference to FIG. 1.

The optical pickup device 100 has a first light source 110, a diffraction grating 120, a prism beam splitter 130, a flat beam splitter 140, a quarter wavelength plate 150, a collimating lens 160, a riser mirror 170, an objective lens 180, a detection lens 300, a second light source 190, a photo detector 200, an optical disc (BD) 210, an optical disc (DVD) 220, and an optical disc (CD) 230. It should be noted that FIG. 1 does not show actuators, which drive the objective lens 180 or collimating lens 160, and holding parts or optical bases such as a holder for holding the aforementioned various optical elements. Reproduction processes on the optical disc (BD) 210, optical disc (DVD) 220 or optical disc (CD) 230 are described hereinafter.

The first light source 110 emits a blue-violet beam. The blue-violet beam emitted from the first light source 110 has a wavelength of 390 to 420 nm. In the present embodiment, the first light source 110 emits a substantially linearly polarized blue-violet beam having a wavelength of 405 nm.

The blue-violet beam emitted from the first light source 110 enters the diffraction grating 120. The diffraction grating 120 divides the blue-violet beam into a 0th-order diffraction light (light without diffraction) and a ±1st-order diffracted light. The divided blue-violet beam enters the prism beam splitter 130.

The beam splitter 130 reflects the blue-violet beam towards the quarter wavelength plate 150. The quarter wavelength plate 150 substantially converts linearly polarized light into circularly polarized light.

The collimating lens 160 is used as a coupling lens. The collimating lens 160 substantially converts the blue-violet beam into collimated light. The collimated light enters the riser mirror 170.

The optical axis OAV substantially perpendicular to a recording surface of optical disc (BD) 210 is defined between the riser mirror 170 and the objective lens 180. The riser mirror 170 reflects the collimated light toward the objective lens 180 so that the collimated light propagates along the optical axis OAV. The objective lens 180 focuses the collimated light onto the recording surface of the optical disc (BD) 210 to cause an optical spot.

The recording surface of the optical disc (BD) 210 reflects the blue-violet beam. The blue-violet beam passes through the objective lens 180 and enters the riser mirror 170 again. The riser mirror 170 reflects the blue-violet beam toward the collimating lens 160. The collimating lens 160 converts the blue-violet beam into convergent light. The quarter wavelength plate 150 converts the convergent light from the collimating lens 160 into linearly polarized light, which is polarized in a direction different from the polarization direction of the light reflected from the beam splitter 130. Thereafter, the blue-violet beam enters the prism beam splitter 130.

The prism beam splitter 130 allows passage of the blue-violet beam converted into linearly polarized light. The blue-violet beam passing through the prism beam splitter 130 enters the detection lens 300 through the flat beam splitter 140.

The detection lens 300 causes astigmatism to the blue-violet beam. The blue-violet beam then enters the photo detector 200.

The optical pickup device 100 has a first actuator (not shown) for driving the objective lens, and an objective lens holder for holding the objective lens 180. The first actuator includes plural suspension wires for supporting the objective lens holder. The objective lens holder is displaced by the first actuator.

The first actuator drives the objective lens 180 in a focusing direction and a tracking direction in response to focus error signals and tracking error signals to make the optical spot follow information tracks of the optical disc (BD) 210 during rotation of the optical disc (BD) 210.

The optical pickup device 100 may have a controller for driving the objective lens 180 at an angle in a radial direction of the optical disc (BD) 210.

FIG. 1 shows the optical axis OAH, which is substantially orthogonal to the optical axis OAV and passes through substantially the center of the collimating lens 160. The optical axis OAH may be defined as a part of a straight line, which is projected from a emission point of the first light source 110 to the center of the objective lens 180 and includes a part passing through the collimating lens 160. The optical pickup device 100 has a second actuator (not shown) for driving the collimating lens 160. The second actuator may be a stepping motor for displacing the collimating lens 160 along the optical axis OAH.

As described below, a position of the collimating lens is referred to as "reference position" if light emitted from the collimating lens 160 becomes collimated light. When the second actuator gets the collimating lens 160 closer to the quarter wavelength plate 150 from the reference position, the light emitted from the collimating lens 160 turns into diverging light. Accordingly, the optical pickup device 100 may correct for spherical aberration, for example, which may occur if the protective substrate of the optical disc (BD) 210 becomes thick.

The second actuator may get the collimating lens 160 closer to the objective lens 180/riser mirror 170 from the reference position. Accordingly, the light emitted from the collimating lens 160 turns into convergent light. For instance, the optical pickup device 100 may correct for spherical aberration, which occurs if the protective substrate of the optical disc (BD) 210 becomes thin.

Therefore, the second actuator may move the collimating lens 160 in accordance with thickness of a protective substrate if the optical disc (BD) 210 has plural recording surfaces and the protective substrates corresponding to the recording surfaces are different in thickness. Accordingly, the spherical aberration may be corrected appropriately. It should be noted that the second actuator may correct for resultant spherical aberration from a change in a temperature of the objective lens 180 or a change in wavelength of the blue-violet beam emitted from the first light source 110.

The first light source 110 may be a semiconductor laser. If a semiconductor laser is used as the first light source 110, the optical pickup device 100 may be small and lightweight. In addition, power consumption of the optical pickup device 100 is reduced.

A polarization separation film may be formed on a reflective surface of the prism beam splitter 130. The polarization separation film may have high reflectivity to certain linearly polarized light and high transmittance to another linearly polarized light orthogonal to the certain linearly polarized light. In the present embodiment, the beam splitter 130 is used together with the quarter wavelength plate 150. Therefore, the beam splitter 130 may not only reflect the light emitted from the first light source 110 at high reflectivity but also allow passage of the reflected light of the optical disc (BD) 210 at high transmittance. Accordingly, the light may be used efficiently, which results in improvement in reproduction performance of the optical pickup device 100 and a reduction in power consumption of the optical pickup device 100.

An exemplary reproducing operation of the optical disc (DVD) 220 or the optical disc (CD) 210 is described.

The second light source 190 may selectively emit a red light beam and an infrared light beam. Upon reproduction of information from the optical disc (DVD) 220, the second light source 190 emits a substantially linearly polarized red light beam. The red light beam has a wavelength of 650 nm to 680 nm. In the present embodiment, the second light source 190 emits a red light beam having a wavelength of 660 nm to the flat beam splitter 140.

The flat beam splitter 140 reflects the red light beam toward the prism beam splitter 130. The prism beam splitter 130 allows passage of the red light beam. The red light beam then enters the quarter wavelength plate 150.

The quarter wavelength plate 150 substantially converts linearly polarized light into circularly polarized light. The red light beam then enters the collimating lens 160.

The collimating lens 160 substantially converts the red light beam into collimated light. The red light beam then enters the riser mirror 170. The riser mirror 170 reflects the red light beam toward the objective lens 180. The objective lens 180 concentrates the light onto the recording surface of the optical disc (DVD) 220 through the protective substrate and forms an optical spot.

The recording surface of the optical disc (DVD) 220 reflects the red light beam. The reflected red light beam passes through the objective lens 180 again, and then enters the riser mirror 170. The riser mirror 170 reflects the red light beam toward the collimating lens 160. The collimating lens 160 converts the red light beam into convergent light. Subsequently, the red light beam enters the quarter wavelength plate 150.

The quarter wavelength plate 150 converts the convergent light obtained from the collimating lens 160 into linearly polarized light which is polarized in a direction different from the polarization direction of the light reflected from the beam splitter 130. The red light beam then enters the prism beam splitter 130. The prism beam splitter 130 allows passage of the red light beam. The red light beam then enters the detection lens 300 through the flat beam splitter 140. The detection lens 300 causes astigmatism to the red light beam. The red light beam then enters the photo detector 200.

Reproduction operation on the optical disc (CD) 230 is substantially the same as the reproduction operation on the optical disc (DVD) 220. The second light source 190 emits substantially linearly polarized infrared light beam. The infrared light beam has a wavelength of 750 nm to 810 nm. In the present embodiment, the second light source 190 emits a red infrared light beam having a wavelength of 780 nm toward the flat beam splitter 140.

The flat beam splitter 140 reflects the infrared light beam toward the prism beam splitter 130. The prism beam splitter 130 allows passage of the infrared light beam. The infrared light beam then enters the quarter wavelength plate 150.

The quarter wavelength plate 150 substantially converts linearly polarized light into circularly polarized light. Subsequently, the infrared light beam enters the collimating lens 160.

The collimating lens 160 substantially converts the infrared light beam into collimated light. The infrared light beam then enters the riser mirror 170. The riser mirror 170 reflects the infrared light beam toward the objective lens 180. The objective lens 180 concentrates the light onto the recording surface of the optical disc (CD) 230 through the protective substrate and forms an optical spot.

The recording surface of the optical disc (CD) 230 reflects the infrared light beam. The reflected infrared light beam passes through the objective lens 180 again, and then enters the riser mirror 170. The riser mirror 170 reflects the infrared light beam toward the collimating lens 160. The collimating lens 160 converts the infrared light beam into convergent light. Subsequently, the infrared light beam enters the quarter wavelength plate 150.

The quarter wavelength plate 150 converts the convergent light obtained from the collimating lens 160 into linearly polarized light, which is polarized in a direction different from the polarization direction of the light reflected from the beam splitter 130. The infrared light beam then enters the prism beam splitter 130. The prism beam splitter 130 allows passage of the infrared light beam. Thereafter, the infrared light beam enters the detection lens 300 through the flat beam splitter 140. The detection lens 300 causes astigmatism to the infrared light beam. The infrared light beam then enters the photo detector 200.

In the operation of reproducing information contained in the optical disc (DVD) 220 and the operation of reproducing information contained in the optical disc (CD) 230, the light beam transmitted from the second light source 190 to the flat beam splitter 140 is mainly S-polarized light. The light reflected from the optical disc (DVD) 220 and the optical disc (CD) 230 is converted mainly into P-polarized light by the quarter wavelength plate 150, and then enters the flat beam splitter 140.

A reflective surface of the flat beam splitter 140 may be formed using a polarization separation film. The polarization separation film generally has high reflectivity to the S-polarized light and high transmittance to the P-polarized light. Because characteristics of the polarization separation film are effectively utilized, light is used efficiently. Therefore, the optical pickup device 100 has excellent reproduction performance under reduced power consumption.

The optical pickup device may have a half-wavelength plate between the second light source and the flat beam splitter. The optical pickup device may use the half-wavelength plate to align the light entering the flat beam splitter with S-polarized light. The optical pickup device 100 according to the present embodiment does not require a half-wavelength plate. Therefore, the optical pickup device 100 may be small and lightweight. In addition, the optical pickup device 100 is produced inexpensively.

The second light source 190 may be a semiconductor laser. If a semiconductor laser is used as the second light source 190, the optical pickup device 100 may become small and lightweight. In addition, power consumption of the optical pickup device 100 may be reduced.

During reproducing operation on the optical disc (DVD) 220 or optical disc (CD) 230, the second actuator may get the collimating lens 160 closer to the quarter wavelength plate 150 from the reference position to transform the light emitted from the collimating lens 160 into diverging light. Accordingly, a light beam emitted from an object point positioned at a virtual positive (+) direction enters the objective lens 180. The second actuator may get the collimating lens 160 closer to the objective lens 180/riser mirror 170 from the reference position to transform the light emitted from the collimating lens 160 into convergent light. Accordingly, the light beam emitted from an object point positioned at a virtual negative (−) direction enters the objective lens 180.

During the reproduction operation on the optical disc (DVD) 220, the second actuator may move the collimating lens 160 toward the objective lens 180/riser mirror 170 so that the infrared light beam emitted from the second light source 190 enters the objective lens 180 as convergent light, which may result in effective correction for a part of the spherical aberration.

During the reproduction operation on the optical disc (CD) 230, the second actuator may move the collimating lens 160 toward the quarter wavelength plate 150 so that the infrared light beam emitted from the second light source 190 enters the objective lens 180 as diverging light, which may result in effective correction for a part of the spherical aberration.

The second actuator which displaces the collimating lens 160 makes the blue-violet beam, which is emitted from the first light source 110, and the red and infrared light beams, which are emitted from the second light source 190, enter the objective lens 180 as collimated light, convergent light or diverging light, selectively. Thus, spherical aberration caused by a change in the wavelength of the light emitted from each of the light sources corresponding to the optical disc (BD) 210, the optical disc (DVD) 220 and the optical disc (CD) 230 and a difference in thickness among the protective substrates of these discs may be partially corrected effectively. When the objective lens 180 has a diffraction structure, the freedom of a diffraction structure design of the objective lens 180 may be improved due to the aforementioned effective correction. If a large pitch is set to a design of the diffraction structure, the diffraction efficiency and manufacturing margin increase. If the light beam enters the objective lens 180 as diverging light, a working distance (WD) between the objective lens 180 and the disc increases.

The protective substrate of the optical disc (CD) 230 is relatively thick. When the objective lens 180 is compatible among plural standards (BD, DVD, CD) and the infrared light beam enters the objective lens 180 as diverging light at the time of recording information in the optical disc (CD) 230 and/or reproducing the information from the optical disc (CD) 230, the working distance decreases.

A condition of the light beam (collimated light, convergent light or diverging light), which is emitted from the first and second light sources 110, 190 and enters the objective lens 180, may be determined on the basis of a design of the objective lens 180.

In the present embodiment, the blue-violet beam enters the objective lens 180 substantially as collimated light. The red light beam enters the objective lens 180 as convergent light. The infrared light beam enters the objective lens 180 as diverging light. Alternatively, another combination of a type of light beam and a condition of the light beam may be used.

In the present embodiment, a stepping motor is used as the second actuator for driving the collimating lens. Alternatively, an actuator using a magnetic circuit or a piezoelectric element may be used as the second actuator. If a stepping motor is used as the second actuator, it is not necessary to monitor a position of the collimating lens 160 on the optical axis OAH. Therefore, the optical pickup device may be simplified. On the other hand, if an actuator using a magnetic circuit or a piezoelectric element is used as the second actuator, a driving portion of the actuator becomes small. Therefore, such an actuator using a magnetic circuit or a piezoelectric element may be preferably used in a small optical head.

(Detection Lens)

The detection lens 300 is described with reference to FIG. 1.

The detection lens 300 is designed on the basis of typical astigmatic methods to cause astigmatism for controlling focusing errors. A lens with a cylindrical surface is exemplified as the detection lens 300.

The photo detector 200 has, for example, a light receiving portion which is divided into four sections. When the light receiving portion receives light through the detection lens 300, focus control signals and tracking control signals may be simultaneously generated by the astigmatic method and the push-pull method, respectively.

When the optical axis OAH of the collimating lens 160 roughly matches the radial or tangential direction of the optical disc (the optical disc (BD) 210, the optical disc (DVD) 220 or the optical disc (CD) 230), and when a direction to cause astigmatism is inclined at approximately 45° with respect to a direction in which push-pull takes place (the radial direction), very stable focus control signals and tracking control signals may be generated by the astigmatic method and the push-pull method, respectively, by using the quarterly divided light receiving surfaces of the photo detector 200. When the direction in which astigmatism is caused is inclined at approximately 45° with respect to the radial direction, the direction in which astigmatism is caused is also inclined at approximately 45° with respect to the tangential direction.

When the detection lens 300 has a lens surface as a cylindrical surface, which is formed so as to cause astigmatism, an angle of the generatrix of the cylindrical surface may be slightly tilted from the abovementioned angle of 45°. The detection lens 300 causes astigmatism to the light beam to generate a focal line. In general, the light beam is set to a position of the least circle of confusion (i.e. an intermediate position between front and rear focal lines) on the photo detector 200. The optimal angle of the focal line is ±45° with respect to the radial direction. Under the condition of the generatrix of the cylindrical surface tilted slightly from the angle of 45°, the detection lens 300 may cause an angle of the focal line, which is coincident to ±45°, with respect to the radial direction. Optimal angular difference of the generatrix depends on an optical path difference or aberration applied by an optical element other than the detection lens 300. Generally, the angle of the generatrix is set within a range of 40° to 50° with respect to the radial direction. It should be noted that the aforementioned optical design is well known.

Under these conditions, when the direction of the generatrix of the cylindrical lens surface rotates by 90°, the sign of the focus control signals is inverted. On the other hand, when the direction of the generatrix of the cylindrical lens surface rotates by 180°, the direction of the astigmatism is the same as the direction of the generatrix before the rotation. Thus, the sign of the focus control signals is not inverted. Therefore, the detection lens 300 may be incorporated in the optical pickup device 100 so as to be in the position at 180° from a designed rotational position. The detection lens 300, however, should not be incorporated at a position at an angle other than the reference position or 180° in the optical pickup device 100.

Figure 2A:
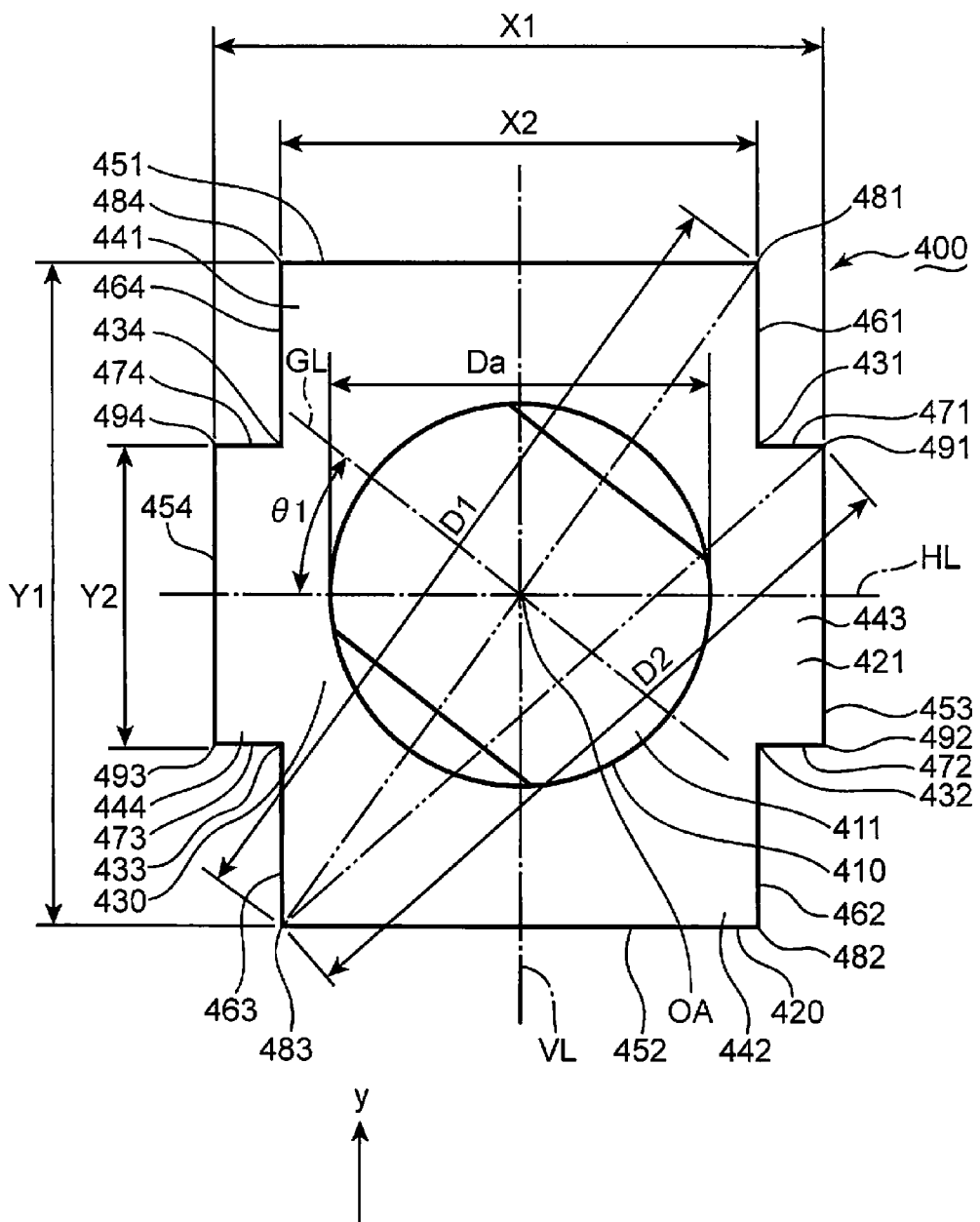
FIG. 2A is a schematic front view of a detection lens used in the optical pickup device shown in FIG. 1.
Figure 2B:
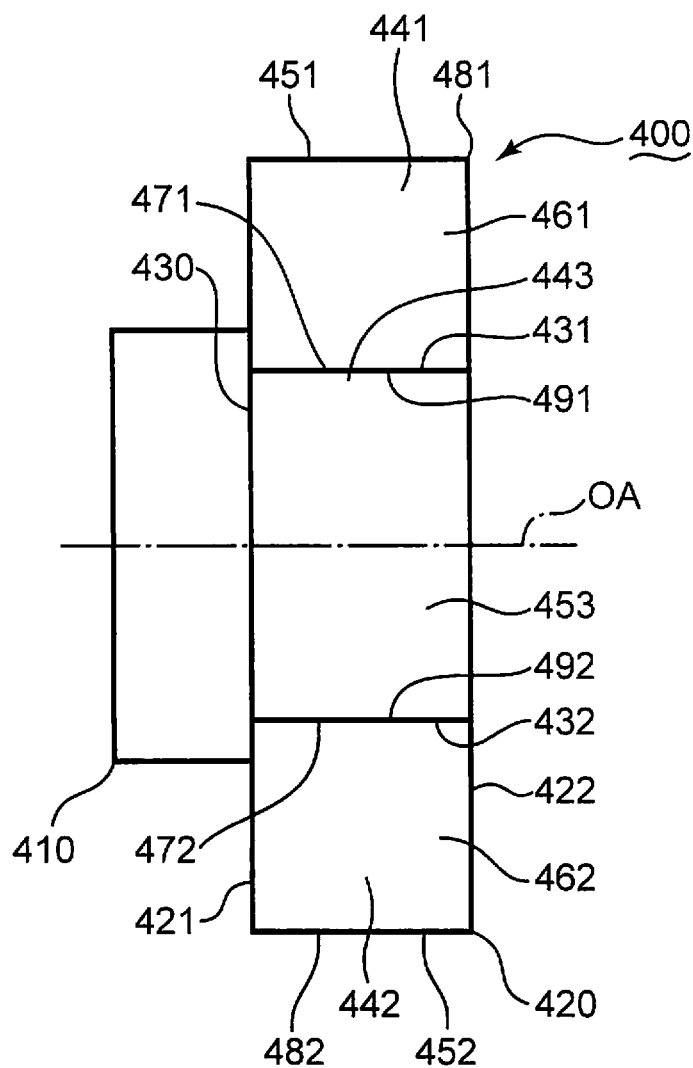
FIG. 2B is a schematic side view of the detection lens shown in FIG. 2A.

FIG. 2A is a schematic front view of a detection lens 400. FIG. 2B is a schematic side view of the detection lens 400. The detection lens 400 is described with reference to FIGS. 1 to 2B.

The detection lens 400 may be used as the detection lens 300 described with reference to FIG. 1.

The z-axis shown in FIG. 2B represents a direction parallel to the optical axis OA of the detection lens 400. The x-axis shown in FIG. 2A represents a direction parallel to the horizontal line HL orthogonal to the optical axis OA. The y-axis shown in FIGS. 2A and 2B represents a direction parallel to the vertical line VL orthogonal to the optical axis OA and the horizontal line HL. The coordinate systems shown in FIGS. 2A and 2B are commonly used in various drawings described below. Direction defined by the coordinate systems and directional terms such as "horizontal", "vertical", "left", "right", "top" and "bottom" are used for clarifying the following description. Therefore, the directional definitions and terms do not at all limit the principles of the present embodiment. In the present embodiment, the vertical line VL is exemplified as the first axis. The horizontal line HL is exemplified as the second axis.

The detection lens 400 includes a cylindrical lens portion 410, which has a lens surface 411 to cause astigmatism, and a flange portion 420, to which the lens portion 410 is connected. The lens portion 410 and the flange portion 420 may be integrally molded using resin molding techniques. The detection lens 400 may be installed so that light enters the lens surface 411. Alternatively, the detection lens 400 may be installed so that light is emitted from the lens surface 411. In the present embodiment, the lens surface 411 is designed so that the lens portion 410 functions as a cylindrical lens. Alternatively, the lens surface may be formed into a different shape to cause astigmatism.

The flange portion 420 includes a first surface 421, to which the lens portion 410 is connected, and a second surface 422 opposite to the first surface 421. The second surface 422 may be flat or concaved. If a concaved surface is formed at an intersection of the second surface 422 with the optical axis OA, the second surface 422 may cause desired optical effects together with the lens surface 411 of the lens portion 410. The detection lens 400 does not have a projection on the second surface 422. Therefore, an operator attaching the detection lens 400 may appropriately set an orientation of the detection lens 400 in a direction of the optical axis OA (the z-axis).

The flange portion 420 includes a first reentrant corner 431 recessed on the right of the lens portion 410, a second reentrant corner 432 recessed below the first reentrant corner 431, a third reentrant corner 433 recessed on the left of the lens portion 410, and a fourth reentrant corner 434 recessed above the third reentrant corner 433. The flange portion 420 includes a base 430 which is defined as a rectangular region surrounded by four lines connecting the first to fourth reentrant corners 431, 432, 433, 434. The base 430 is disposed along the optical axis OA defined by the lens portion 410, so that the center of the base 430 roughly matches the optical axis OA. Therefore, the lens portion 410 is connected mainly to the base 430.

The flange portion 420 includes a rectangular upper projection 441, which projects upward from the base 430, a rectangular lower projection 442, which projects downward from the base 430, a rectangular right projection 443, which projects to the right from the base 430, and a rectangular left projection 444, which projects to the left from the base 430. The vertical line VL is equivalent to the centerline of the upper and lower projections 441, 442. The upper and lower projections 441, 442 project along the vertical line VL. The horizontal line HL is equivalent to the centerline of the right and left projections 443, 444. The right and left projections 443, 444 project along the horizontal line HL.

The lower projection 442 is point-symmetric to the upper projection 441 around the optical axis OA. The left projection 444 is point-symmetric to the right projection 443 around the optical axis OA. In the present embodiment, the upper projection 441 is exemplified as the first projection. The lower projection 442 is exemplified as the second projection. The right projection 443 is exemplified as the third projection. The left projection 444 is exemplified as the fourth projection.

The upper projection 441 includes an upper intersecting surface 451 which intersects with the vertical line VL substantially at right angle. The lower projection 442 includes a lower intersecting surface 452 which intersects with the vertical line VL substantially at right angle. The right projection 443 includes a right intersecting surface 453 which intersects with the horizontal line HL substantially at right angle. The left projection 444 includes a left intersecting surface 454 which intersects with the horizontal line substantially at right angle. The upper and lower intersecting surfaces 451, 452 are substantially parallel to the horizontal line HL. The right and left intersecting surfaces 453, 454 are substantially parallel to the vertical line VL. In the present embodiment, the upper intersecting surface 451 is exemplified as the first intersecting surface. The lower intersecting surface 452 is exemplified as the second intersecting surface. The right intersecting surface 453 is exemplified as the third intersecting surface. The left intersecting surface 454 is exemplified as the fourth intersecting surface.

In FIG. 2A, the distance between the upper and lower intersecting surfaces 451, 452 is denoted by "Y1". The distance between the right and left intersecting surfaces 453, 454 is denoted by "X1". The flange portion 420 is designed so that the distance between the upper and lower intersecting surfaces 451, 452 is longer than the distance between the right and left intersecting surfaces 453, 454 (Y1>X1). In the present embodiment, the distance denoted by "Y1" is exemplified as the first distance. The distance denoted by "X1" is exemplified as the second distance.

The first reentrant corner 431 is a base end shared by the upper and right projections 441, 443. The upper projection 441 includes a vertical surface 461 which extends upward from the first reentrant corner 431 toward the upper intersecting surface 451. The right projection 443 includes a horizontal surface 471 which extends rightward from the first reentrant corner 431 toward the right intersecting surface 453. The first reentrant corner 431 may be defined as a corner which is formed by the vertical and horizontal surfaces 461, 471.

The vertical surface 461 forms a corner 481 together with the upper intersecting surface 451. The horizontal surface 471 forms a corner 491 together with the right intersecting surface 453. In the present embodiment, the vertical surface 461 is exemplified as the first projection surface. The corner 481 is exemplified as the first corner. The horizontal surface 471 is exemplified as the third projection surface. The corner 491 is exemplified as the third corner.

The second reentrant corner 432 is a base end shared by the lower and right projections 442, 443. The lower projection 442 includes a vertical surface 462 which extends downward from the second reentrant corner 432 toward the lower intersecting surface 452. The right projection 443 includes a horizontal surface 472 which extends rightward from the second reentrant corner 432 toward the right intersecting surface 453. The second reentrant corner 432 may be defined as a corner formed by the vertical and horizontal surfaces 462, 472. The vertical surface 462 of the lower projection 442 is formed substantially on the same plane as the vertical surface 461 of the upper projection 441. The horizontal surfaces 471, 472 of the right projection 443 are substantially parallel to each other.

The vertical surface 462 forms a corner 482 together with the lower intersecting surface 452. The horizontal surface 472 forms a corner 492 together with the right intersecting surface 453.

The third reentrant corner 433 is a base end shared by the lower and left projections 442, 444. The lower projection 442 includes a vertical surface 463 which extends downward from the third reentrant corner 433 toward the lower intersecting surface 452. The left projection 444 includes a horizontal surface 473 which extends leftward from the third reentrant corner 433 toward the left intersecting surface 454. The third reentrant corner 433 may be defined as a corner which is formed by the vertical and horizontal surfaces 463, 473. The vertical surfaces 462, 463 of the lower projection 442 are substantially parallel to each other. The horizontal surface 473 of the left projection 444 is formed substantially on the same plane as the horizontal surface 472 of the right projection 443.

The vertical surface 463 forms a corner 483 together with the lower intersecting surface 452. The horizontal surface 473 forms a corner 493 together with the left intersecting surface 454. In the present embodiment, the vertical surface 463 is exemplified as the second projection surface. The corner 483 is exemplified as the second corner.

The fourth reentrant corner 434 is a base end shared by the upper and left projections 441, 444. The upper projection 441 includes a vertical surface 464 which extends upward from the fourth reentrant corner 434 toward the upper intersecting surface 451. The left projection 444 includes a horizontal surface 474 which extends leftward from the fourth reentrant corner 434 toward the left intersecting surface 454. The fourth reentrant corner 434 may be defined as a corner which is formed by the vertical and horizontal surfaces 464, 474. The vertical surface 464 of the upper projection 441 is formed substantially on the same plane as the vertical surface 463 of the lower projection 442. The horizontal surfaces 473, 474 of the left projection 444 are substantially parallel to each other.

The vertical surface 464 forms a corner 484 together with the upper intersecting surface 451. The horizontal surface 472 forms a corner 494 together with the right intersecting surface 453.

In FIG. 2A, the distance between the vertical surfaces 461, 464 of the upper projection 441 is denoted by "X2". The distance between the vertical surfaces 462, 463 of the lower projection 442 may be denoted by "X2".

In FIG. 2A, the distance between the horizontal surfaces 473, 474 of the left projection 444 is denoted by "Y2". The distance between the horizontal surfaces 471, 472 of the right projection 443 may be denoted by "Y2".

In FIG. 2A, the distance between the corners 481, 483 of the upper and lower projections 441, 442 is denoted by "D1". The distance between the corners 483, 491 of the lower and right projections 442, 443 is denoted by "D2". The width of the lens portion 410 on the horizontal line HL is denoted by "Da".

FIG. 2A shows the generatrix GL of the cylindrical lens used as the lens surface 411. The angle between the generatrix GL and the horizontal line HL is denoted by "θ1". The horizontal line HL, vertical line VL and generatrix GL shown in FIG. 2A are virtual lines. In the present embodiment, the lens surface 411 formed as a cylindrical lens is exemplified as the first lens surface. Alternatively, the first lens surface may be a lens element configured to cause astigmatism. For example, a lens element with a toroidal surface may be used instead of the cylindrical lens.

As shown in FIG. 2A, the flange portion 420 is symmetric with respect to the horizontal line HL. The flange portion 420 is also symmetric with respect to the vertical line VL. The lens portion 410 projects from the first surface 421 whereas the flange portion 420 does not have a projection on the second surface 422.

(Lens Holder)

Figure 3A:
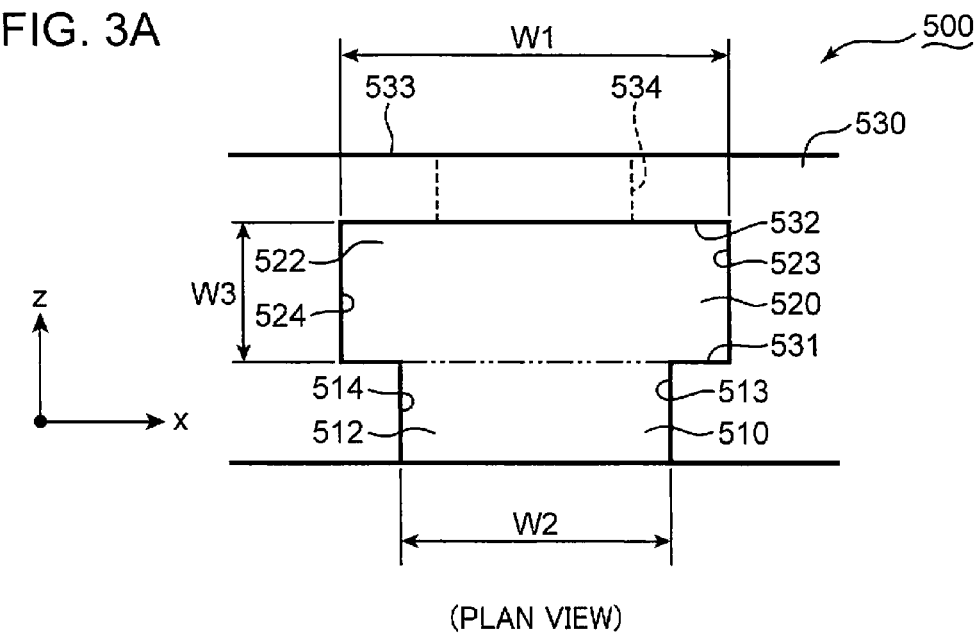
FIG. 3A is a schematic plan view of a lens holder configured to hold the detection lens shown in FIGS. 2A and 2B.
Figure 3B:
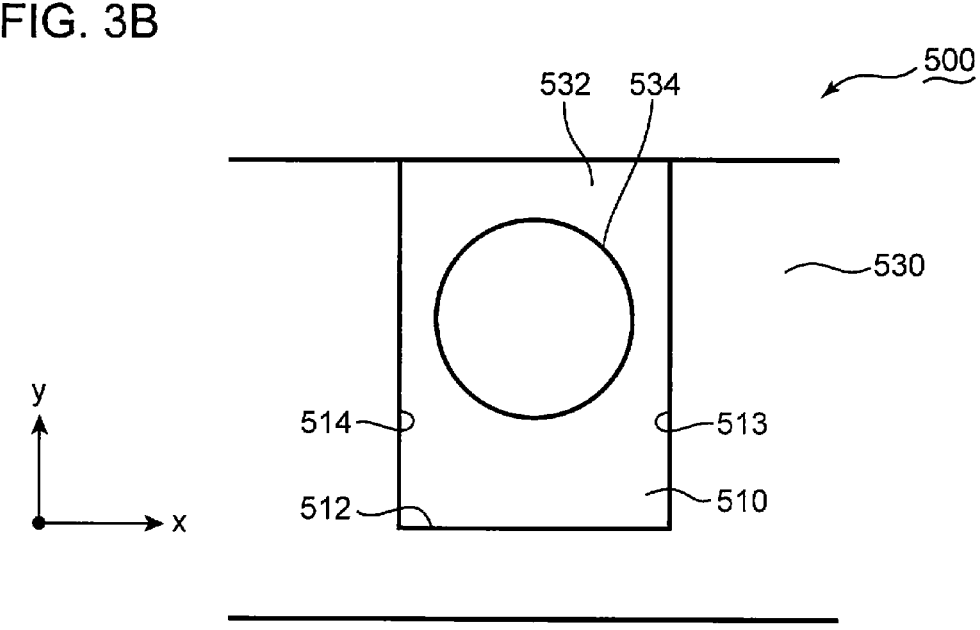
FIG. 3B is a schematic front view of the lens holder shown in FIG. 3A.

FIG. 3A is a schematic plan view of a lens holder 500 configured to hold the detection lens 400. FIG. 3B is a schematic front view of the lens holder 500. The lens holder 500 is described with reference to FIGS. 2A to 3B.

The lens holder 500 includes a holding wall 530 configured to define a lens chamber 510, into which the lens portion 410 is inserted, and a flange chamber 520, into which the flange portion 420 is inserted. The holding wall 530 includes an inner bottom surface 512 situated below the lens portion 410, which stored in the lens chamber 510, an inner right surface 513 situated on the right of the lens portion 410, and an inner left surface 514 situated on the left of the lens portion 410. The lens chamber 510 is defined by the inner right surface 513, the inner bottom surface 512 and the inner left surface 514. The holding wall 530 further includes a lower adjacent surface 522, which is adjacent to the lower intersecting surface 452 of the flange portion 420 stored in the flange chamber 520, a right adjacent surface 523, which is adjacent to the right intersecting surface 453, and a left adjacent surface 524, which is adjacent to the left intersecting surface 454. The holding wall 530 further includes a first adjacent surface 531, which faces the first surface 421 of the flange portion 420 stored in the flange chamber 520, and a second adjacent surface 532, which faces the second surface 422. The first adjacent surface 531 is adjacent to a boundary between the lens and flange chambers 510, 520. The holding wall 530 further includes an outer surface 533 opposite to the second adjacent surface 532. In the present embodiment, the flange chamber 520 is exemplified as the first insertion space. The lens chamber 510 is exemplified as the second insertion space. The holding wall 530 is exemplified as the wall portion.

The holding wall 530 is provided with a light transmission hole 534 extending between the second adjacent surface 532 and the outer surface 533. The light transmission hole 534 allows passage of light, which enters the detection lens 400 and/or is emitted from the detection lens 400.

In FIG. 3A, the distance between the right and left adjacent surfaces 523, 524 (i.e. the width of the flange chamber 520 in the x-axis direction) is denoted by "W1". The distance between the inner right and left surfaces 513, 514 (i.e. the width of the lens chamber 510 in the x-axis direction) is denoted by "W2". The distance between the first and second adjacent surfaces 531, 532 (i.e. the thickness of the flange chamber 520 in the z-axis direction) is denoted by "W3".

The distance between the upper and lower intersecting surfaces 451, 452 (denoted by "Y1" in FIG. 2A) is longer than the distance between the right and left adjacent surfaces 523, 524 (denoted by "W1" in FIG. 3A). The distance between the right and left intersecting surfaces 453, 454 (denoted by "X1" in FIG. 2A) is shorter than the distance between the right and left adjacent surfaces 523, 524, but the distance between the right and left intersecting surfaces 453, 454 is longer than the distance between the inner right and left surfaces 513, 514 (denoted by "W2" in FIG. 3A). The distance between the inner right and left surfaces 513, 514 is longer than the width of the lens portion 410 on the horizontal line HL (denoted by "Da" in FIG. 2A). Therefore, the relationship expressed by the following inequality is satisfied among these dimensional values described with reference to FIGS. 2A and 3A.

$$Y1 > W1 > X1 > W2 > Da \quad \text{[Equation 1]}$$

(Lens Unit)

Figure 4A:
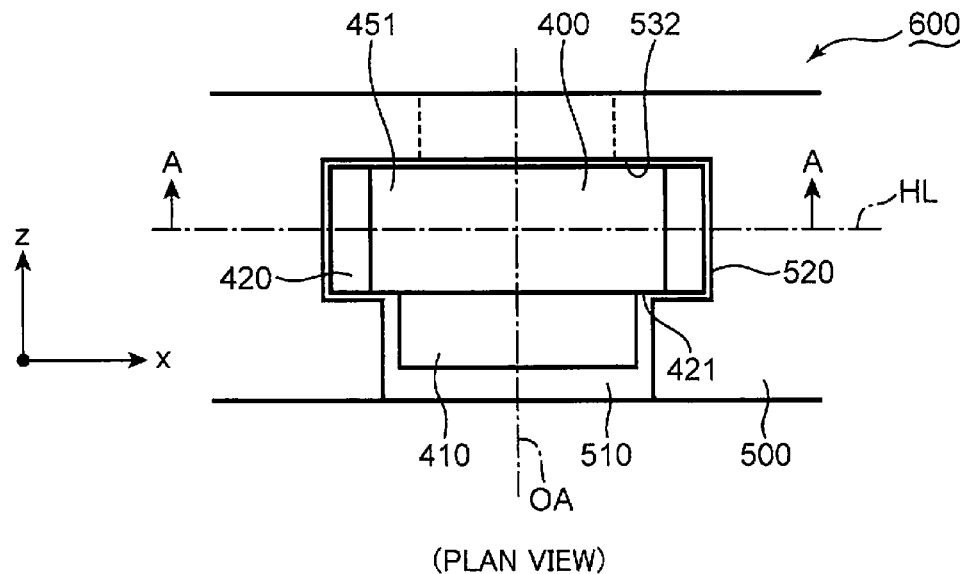
FIG. 4A is a schematic plan view of a lens unit according to the first embodiment.
Figure 4B:
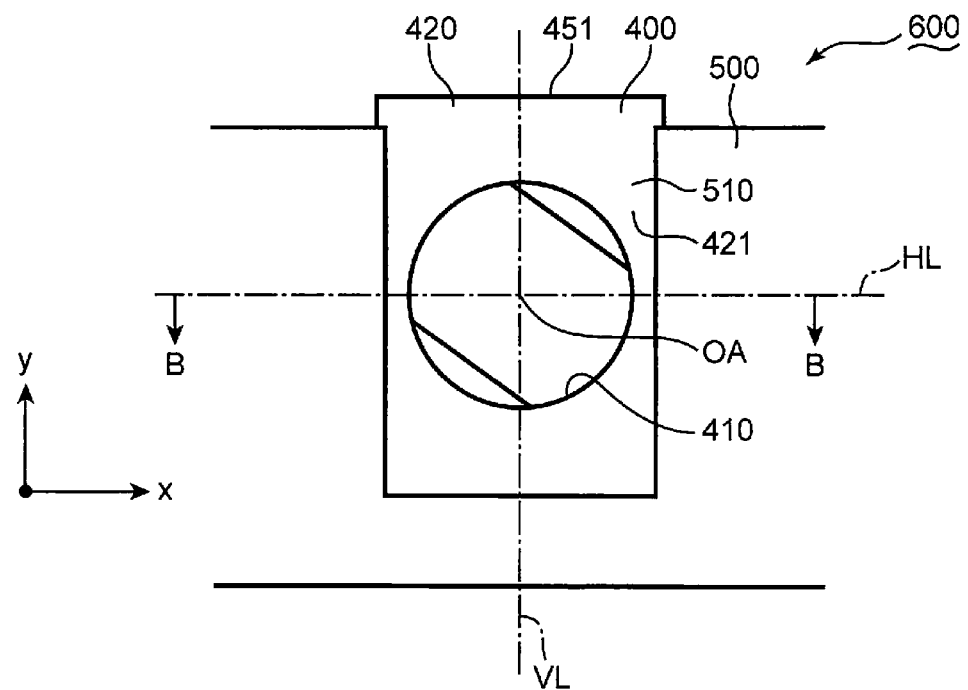
FIG. 4B is a schematic front view of the lens unit shown in FIG. 4A.
Figure 5A:
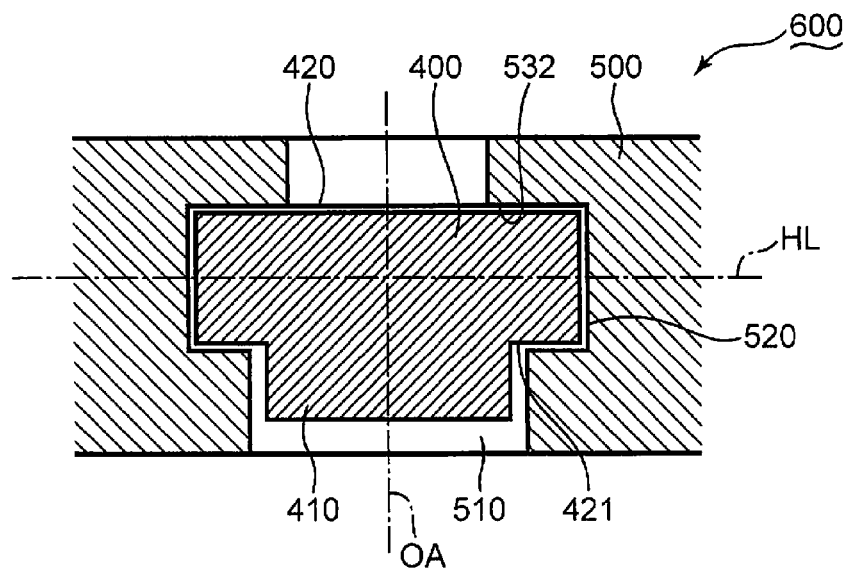
FIG. 5A is a schematic cross-sectional view of the lens unit along the line B-B shown FIG. 4B.
Figure 5B:
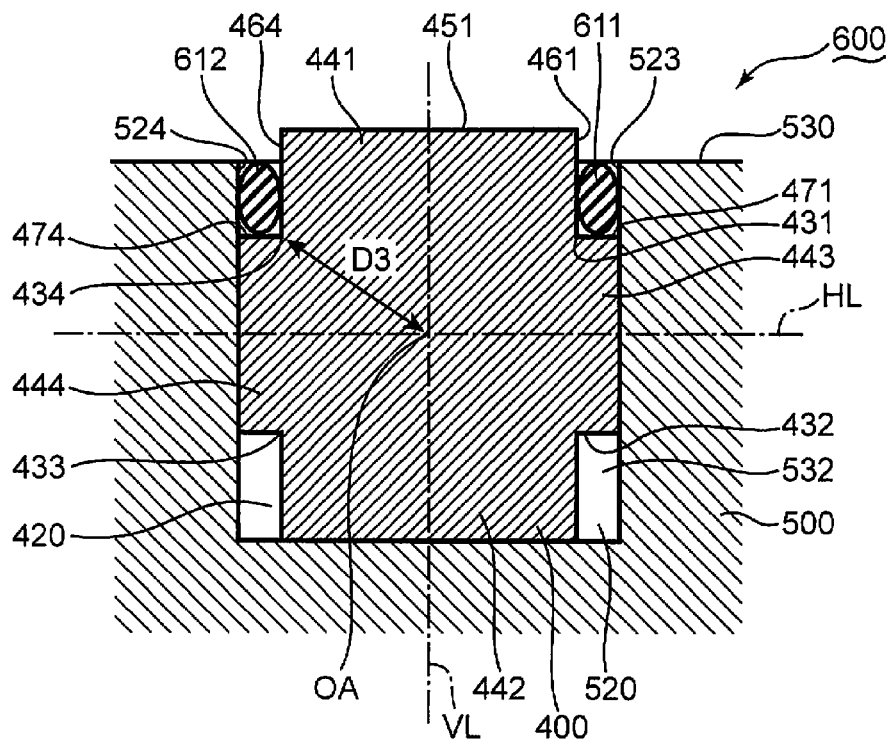
FIG. 5B is a schematic cross-sectional view of the lens unit along the line A-A shown in FIG. 4A.

FIG. 4A is a schematic plan view of a lens unit 600. FIG. 4B is a schematic front view of the lens unit 600. FIG. 5A is a schematic cross-sectional view of the lens unit 600 along the line B-B shown FIG. 4B. FIG. 5B is a schematic cross-sectional view of the lens unit 600 along the line A-A shown in FIG. 4A. The lens unit 600 is described with reference to FIGS. 2A, 3A, 4A to 5B.

The lens unit 600 includes the detection lens 400 and the lens holder 500. An operator may insert the lens portion 410 into the lens chamber 510 and the flange portion 420 into the flange chamber 520.

The lens portion 410 projects from the first surface 421. As shown in the aforementioned inequality, the dimensional value "X1" described with reference to FIG. 2A is greater than the dimensional value "W2" described with reference to FIG. 3A. Thus, if the operator makes the lens portion 410 face the second adjacent surface 532, the detection lens 400 may not be stored in the lens holder 500. Therefore, the operator is less likely to mistake the orientation of the detection lens 400 in the direction along the optical axis OA.

As shown in the aforementioned inequality, the dimensional value "Da" described with reference to FIG. 2A is smaller than the dimensional value "W2" described with reference to FIG. 3A. The dimensional value "X1" described with reference to FIG. 2A is smaller than the dimensional value "W1" described with reference to FIG. 3A. Therefore, when the operator sets the orientation of the detection lens 400 correctly and keeps the upper intersecting surface 451 substantially horizontal, the detection lens 400 may be easily stored in the lens holder 500.

As shown in the aforementioned inequality, the dimensional value "Y1" described with reference to FIG. 2A is greater than the dimensional value "W1" described with reference to FIG. 3A. Therefore, when the operator tilts the upper intersecting surface 451 from the horizontal position, the detection lens 400 may not be stored in the lens holder 500 easily. Therefore, the operator is less likely to mistake the rotational position of the detection lens 400 around the optical axis OA.

The design of the lens unit 600 according to the present embodiment allows the operator to rotate the detection lens 400 by 180° from the rotational position defined on the basis of the design (the rotational position of the detection lens 400 shown in FIGS. 4A to 5B) and store the detection lens 400 in the lens holder 500. On the other hand, the design of the lens unit 600 according to the present embodiment does not allow the operator to store the detection lens 400 in the lens holder 500 if the detection lens 400 is rotated from the normal rotational position (the rotational position of the detection lens 400 shown in FIGS. 4A to 5B) by an angle other than 180°.

The generatrix GL described with reference to FIG. 2A may keep substantially the same position between the detection lens 400 situated at the normal rotational position and the detection lens 400 rotated by 180° around the optical axis OA from the normal rotational position. In other words, the direction of the astigmatism caused by the detection lens 400 is maintained. Thus, the lens unit 600 may keep its performance even if the operator rotates the detection lens 400 by 180° from the normal rotational position and then incorporates the detection lens 400 into the lens holder 500.

In prior arts, the detection lens is sometimes rotated by 90° from the normal position and incorporated in the lens holder. In this case, the sign of focus control signals is inverted. According to the principles of the present embodiment, on the other hand, the detection lens 400 is incorporated in the lens holder 500 only if the rotational position of the detection lens 400 does not invert the sign of focus control signals.

In the present embodiment, the inner bottom surface 512 is flush with the lower adjacent surface 522. The inner bottom surface may be formed at a different level unless the inner bottom surface interferes with the lens portion 410.

(Relationship Between Width of Flange Chamber and Diagonal Dimension of Flange Portion)

The relationship between the width "W1" of the flange chamber 520 and the diagonal dimension of the flange portion 420 is described with reference to FIGS. 2A and 3A.

In FIG. 2A, the distance between the corners 481, 483 of the upper and lower projections 441, 442 is denoted by "D1". The dimensional value of the diagonal distance is expressed by the following equation.

$$D1 = \sqrt{Y1^2 + X2^2} \quad \text{[Equation 2]}$$

The flange portion 420 is designed so that the diagonal distance "D1" becomes greater than the width "W1" of the flange chamber 520 described with reference to FIG. 3A. The relationship between the diagonal distance "D1" and the width "W1" of the flange chamber 520 is expressed by the following inequality.

$$D1 > W1 \quad \text{[Equation 3]}$$

Due to the relationship shown in the inequality, when an operator rotates the detection lens 400 by an angle less than 90° from the normal rotational position, the detection lens 400 may not be easily embedded in the lens holder 500. Therefore, the operator may not easily push the detection lens 400 into the lens holder 500 if the detection lens 400 is tilted from the normal rotational position.

In FIG. 2A, the distance between the corners 483, 491 of the lower and right projections 442, 443 is denoted by "D2". The dimensional value of the diagonal distance is expressed by the following equation.

$$D2 = \sqrt{\left(\frac{1}{2} \cdot Y1 + \frac{1}{2} \cdot Y2\right)^2 + \left(\frac{1}{2} \cdot X1 + \frac{1}{2} \cdot X2\right)^2} \quad \text{[Equation 4]}$$

The flange portion 420 is designed so that the diagonal distance "D2" becomes greater than the width "W1" of the flange chamber 520 described with reference to FIG. 3A. The relationship between the diagonal distance "D2" and the width "W1" of the flange chamber 520 is expressed by the following inequality.

$$D2 > W1 \quad \text{[Equation 5]}$$

Due to the relationship shown in the inequality, when the operator rotates the detection lens 400 by an angle less than 90° from the normal rotational position, the detection lens 400 may not be easily embedded in the lens holder 500. Therefore, the operator may not easily push the detection lens 400 into the lens holder 500 if the detection lens 400 is tilted from the normal rotational position.

(Fixing Detection Lens in Lens Holder)

It is described with reference to FIGS. 1, 2A and 5B how to fix the detection lens 400 in the lens holder 500.

As shown in FIG. 2A, the distance "X2" between the vertical surfaces 461, 464 of the upper projection 441 is shorter than the distance "X1" between the right intersecting surface 453, which is adjacent to the right adjacent surface 523, and the left intersecting surface 454, which is adjacent to the left adjacent surface 524. The flange portion 420 is symmetric with respect to the vertical line VL. Therefore, gaps are formed between the right adjacent surface 523 and the vertical surface 461 and between the left adjacent surface 524 and the vertical surface 464.

As shown in FIG. 5B, the lens unit 600 includes a first adhesive portion 611 and a second adhesive portion 612. The first adhesive portion 611 may be adhesive applied to a gap surrounded by the right adjacent surface 523, the vertical surface 461 and the horizontal surface 471. The second adhesive portion 612 may be adhesive applied to a gap surrounded by the left adjacent surface 524, the vertical surface 464 and the horizontal surface 474. In the present embodiment, the gap surrounded by the right adjacent surface 523, the vertical surface 461 and the horizontal surface 471 is exemplified as the first adhesion space. The gap surrounded by the left adjacent surface 524, the vertical surface 464 and the horizontal surface 474 is exemplified as the second adhesion space.

In FIG. 5B, the distance between the fourth reentrant corner 434 and the optical axis OA is denoted by "D3". The distance between the first reentrant corner 431 and the optical axis OA, the distance between the second reentrant corner 432 and the optical axis OA and the distance between the third reentrant corner 433 and the optical axis OA may be denoted by "D3".

The first and fourth reentrant corners 431, 434 are recessed toward the optical axis OA. Therefore, the first and second adhesive portions 611, 612 are situated near the optical axis OA. Accordingly, in comparison to a general detection lens without concave shapes, positional stability of the detection lens 400 may be kept at a higher level. For example, even if the detection lens 400 thermally expands or contracts because of a change in a temperature of the optical pickup device 100 described with reference to FIG. 1, the detection lens 400 is less likely to displace in the lens holder 500.

In the present embodiment, adhesive is applied to the gap surrounded by the right adjacent surface 523, the vertical surface 461 and the horizontal surface 471, and the gap surrounded by the left adjacent surface 524, the vertical surface 464 and the horizontal surface 474. Therefore, the lens holder 500 does not have to have dedicated portions for application of adhesive. Thus, the lens holder 500 may be easily designed so as to make the lens holder 500 mechanically very strong. The optical pickup device 100 on which the lens unit 600 is mounted may be designed to be small because the adhesive does not overflow to the upper surface of the holding wall 530.

As described above, the detection lens 400 is symmetric with respect to the vertical line VL. The detection lens 400 is symmetric with respect to the horizontal line HL. Therefore, if the detection lens 400 is molded by resin molding techniques, the detection lens 400 may keep high performance as a lens.

As described above, the detection lens 400 may be inverted vertically and loaded in the lens holder 500. Recessed portions having the same shape as the aforementioned gaps are formed between the right and lower projections 443, 442 and between the left and lower projections 444, 442. Therefore, high mechanical strength is obtained between the detection lens 400 and the lens holder 500 even if an operator rotates the detection lens 400 by 180° from the normal rotational position and incorporates the lens detection 400 in the lens holder 500.

FIG. 6 is a schematic plan view of the lens holder 500. The lens holder 500 is described with reference to FIGS. 1, 2A and 6.

The lens holder 500 may be designed as an optical base to which the various optical elements described with reference to FIG. 1 are attached. In other words, in the present embodiment the lens holder 500 is integrated with the optical base.

The optical pickup device 100 has shafts 102 configured to support the lens holder 500 designed as the optical base. The various optical elements described with reference to FIG. 1 are set up on the optical base supported by the shafts 102.

The lens chamber 510 and the flange chamber 520 are formed on the optical base. The lens portion 410 described with reference to FIG. 2A is stored in the lens chamber 510. The flange portion 420 is stored in the flange chamber 520. Then, the detection lens 400 is fixed to the optical base by adhesive.

A number of parts configuring the optical pickup device 100 may be reduced by designing the lens holder 500 as the optical base. Consequently, the optical pickup device 100 may be fabricated inexpensively. The optical pickup device 100 may be designed to be small.

The optical pickup device may have an optical base, which is formed separately from the lens holder if necessary. In this case, the lens holder may be incorporated and fixed onto the optical base, and then the detection lens may be incorporated in the lens holder. Alternatively, a lens holder, in which a detection lens is incorporated, may be placed and fixed onto an optical base.

(Materials of Detection Lens)

Materials used in the detection lens 400 are described with reference to FIGS. 1 and 2A.

As shown in FIG. 2A, the detection lens 400 has the substantially cylindrical lens portion 410 and the substantially cross-shaped flange portion 420. In comparison to a conventional detection lens, the detection lens 400 is geometrically simple. Therefore, the detection lens 400 may be molded easily using resin molding techniques.

As described with reference to FIG. 1, the detection lens 400 (denoted by "300" in FIG. 1) is situated near the photo detector 200. Due to passage of the convergent light through the detection lens 400, light density on the detection lens 400 increases. Therefore, it is preferable to use olefin resin as a material of the detection lens 400. Molding the detection lens 400 using olefin resin may prevent deterioration of such characteristics as transmittance and transmission wavefront aberration of the detection lens 400 even under an environment of long radiation of a blue-violet beam emitted from the first light source 110. In particular, molding the detection lens 400 with olefin resin may result in high blue-light resistance of the detection lens 400. Series "340R" and "350R" of the ZEONEX™ (Zeon Corporation) may be exemplified as the olefin resin used in the detection lens 400. With these resin materials, the detection lens 400 may have high blue-light resistance.

Second Embodiment

Figure 7A:
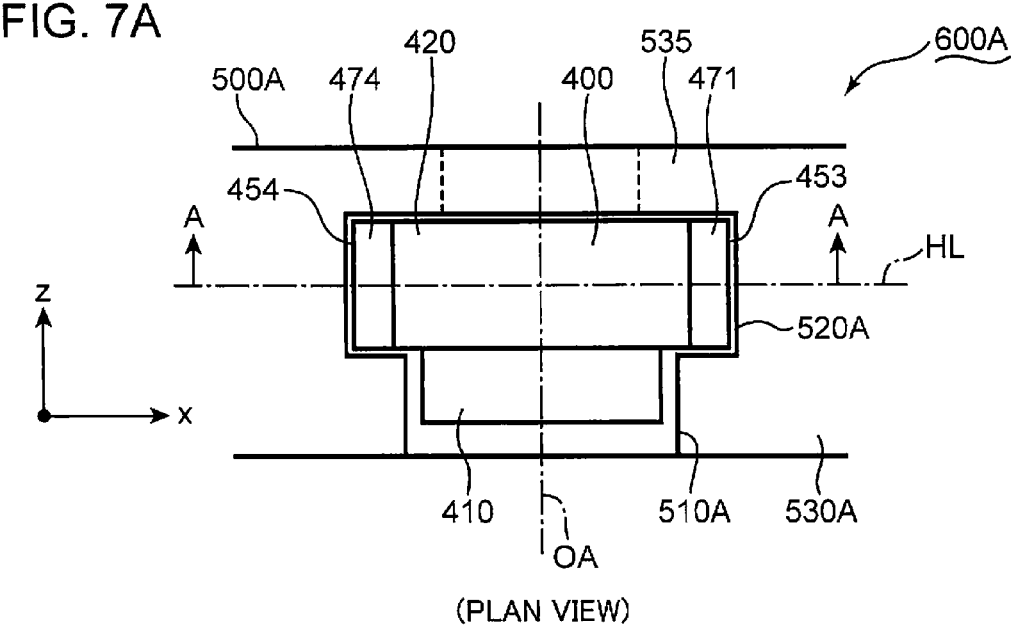
FIG. 7A is a schematic plan view of a lens unit according to the second embodiment.
Figure 7B:
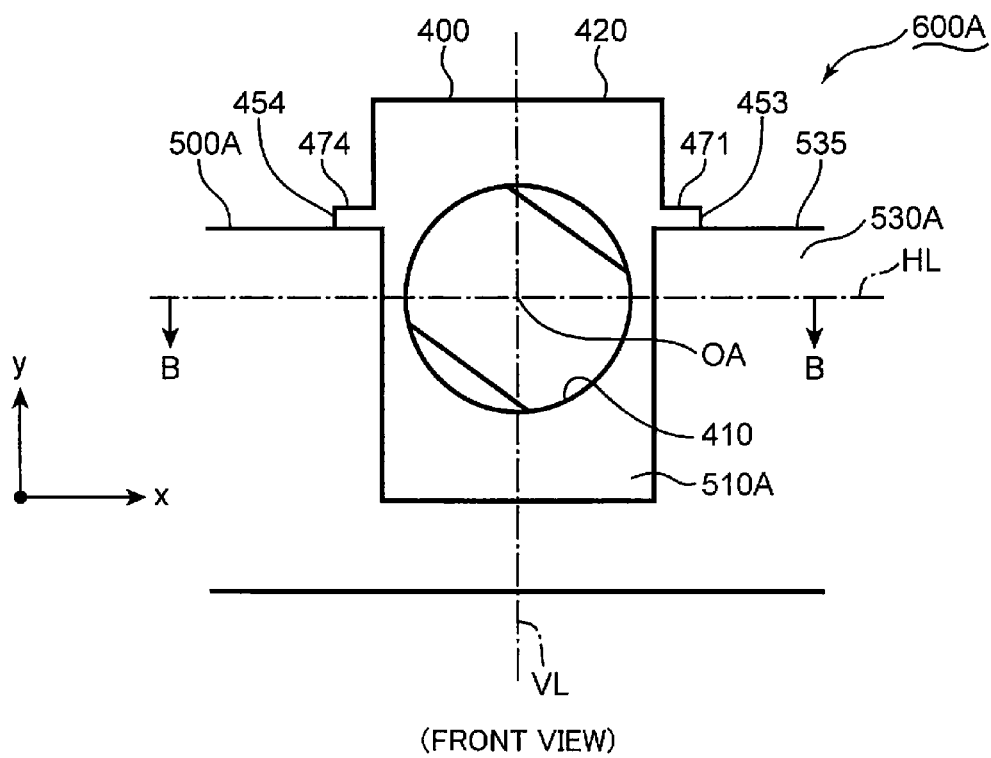
FIG. 7B is a schematic front view of the lens unit shown in FIG. 7A.

FIG. 7A is a schematic plan view of a lens unit 600A according to the second embodiment. FIG. 7B is a schematic front view of the lens unit 600A. The lens unit 600A is described with reference to FIGS. 7A and 7B. The same reference characters are used for indicating the same elements as those described in the first embodiment. Therefore, the description in the context of the first embodiment is employed to indicate the elements denoted by the same reference characters.

Like the first embodiment, the lens unit 600A includes the detection lens 400. The lens unit 600A further includes a lens holder 500A configured to hold the detection lens 400.

The lens holder 500A includes a holding wall 530A. The holding wall 530A defines a lens chamber 510A, in which the lens portion 410 is stored, and a flange chamber 520A, in which the flange portion 420 is stored. The lens chamber 510A may have the same width (i.e. the size in the x-axis direction) as that described in the first embodiment. The lens chamber 510A may have the same thickness (i.e. the size in the z-axis direction) as that described in the first embodiment. However, the depth of the lens chamber 510A (i.e. the size in the y-axis direction) is smaller than that described in the first embodiment. The flange chamber 520A may have the same width as that described in the first embodiment. The flange chamber 520A may have the same thickness as that described in the first embodiment. However, the depth of the flange chamber 520A is smaller than that described in the first embodiment.

The holding wall 530A includes an upper surface 535. Unlike the first embodiment, the upper surface 535 is situated below the horizontal surfaces 471, 474. Thus, the horizontal surfaces 471, 474, a part of the right intersecting surface 453, and a part of the left intersecting surface 454 project from the upper surface 535.

Figure 8A:
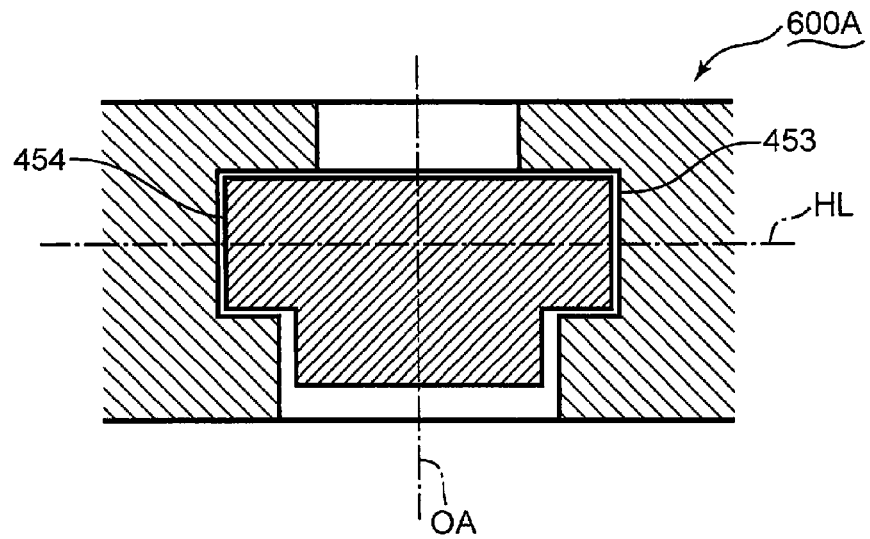
FIG. 8A is a schematic cross-sectional view of the lens unit along the line B-B shown in FIG. 7B.
Figure 8B:
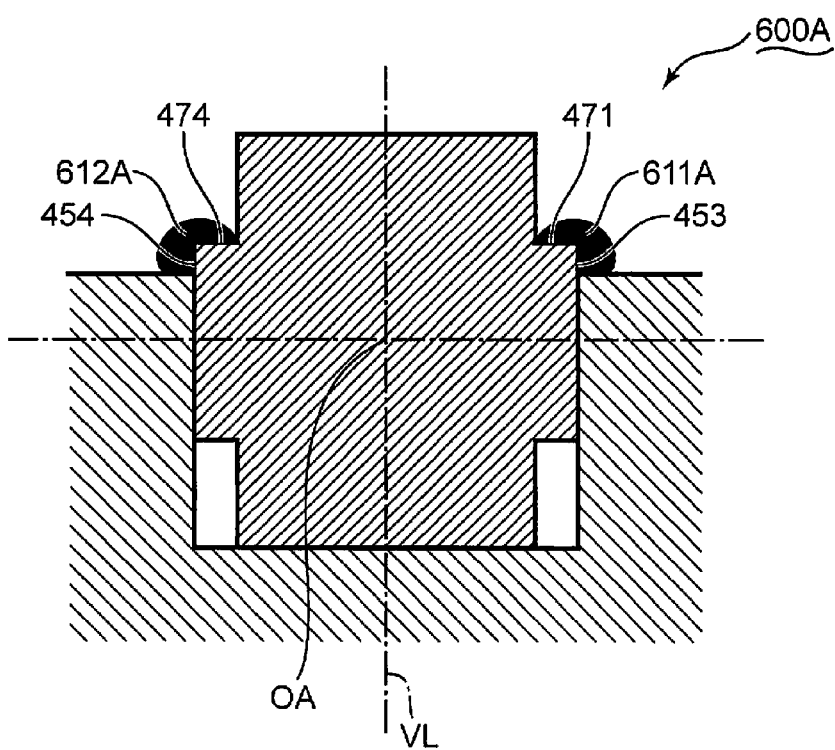
FIG. 8B is a schematic cross-sectional view of the lens unit along the line A-A shown in FIG. 7A.

FIG. 8A is a schematic cross-sectional view of the lens unit 600A along the line B-B shown in FIG. 7B. FIG. 8B is a schematic cross-sectional view of the lens unit 600A along the line A-A shown in FIG. 7A. The lens unit 600A is further described with reference to FIGS. 1 and 7A to 8B.

The lens unit 600A further includes a first adhesive portion 611A and a second adhesive portion 612A. The first adhesive portion 611A is adhesive applied so as to cover the horizontal surface 471 and the right intersecting surface 453 which project from the upper surface 535. The second adhesive portion 612A is adhesive applied so as to cover the horizontal surface 474 and the left intersecting surface 454 which project from the upper surface 535.

Because the detection lens 400 is used in the present embodiment, positional stability of the detection lens 400 may be maintained at a higher level in compared to a general detection lens without concave shapes. For example, even if the detection lens 400 thermally expands or contracts because of a change in a temperature of the optical pickup device 100 described with reference to FIG. 1, the detection lens 400 is less likely to displace in the lens holder 500A. Displacement is less likely to happen to the detection lens 400, for example, under a drop impact applied to the lens holder 500A because the horizontal surfaces 471, 474, a part of the right intersecting surface 453, and a part of the left intersecting surface 454 are covered with the adhesive. Or, the detection lens 400 is less likely to fall off from the lens holder 500A.

In the present embodiment, the horizontal surfaces 471, 474 are situated above the upper surface 535. Alternatively, the horizontal surfaces 471, 474 may be flush with the upper surface of the lens holder.

Third Embodiment

Figure 9A:
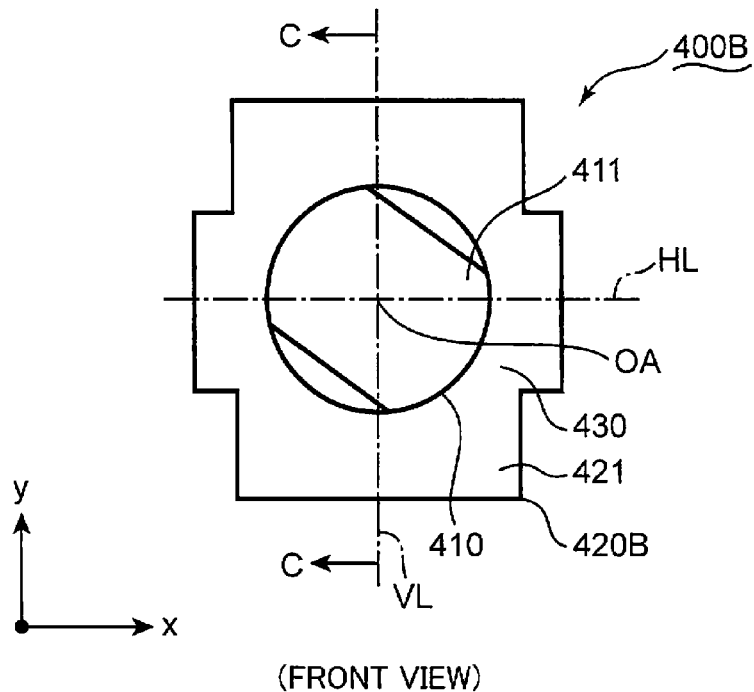
FIG. 9A is a schematic front view of a detection lens according to the third embodiment.
Figure 9B:
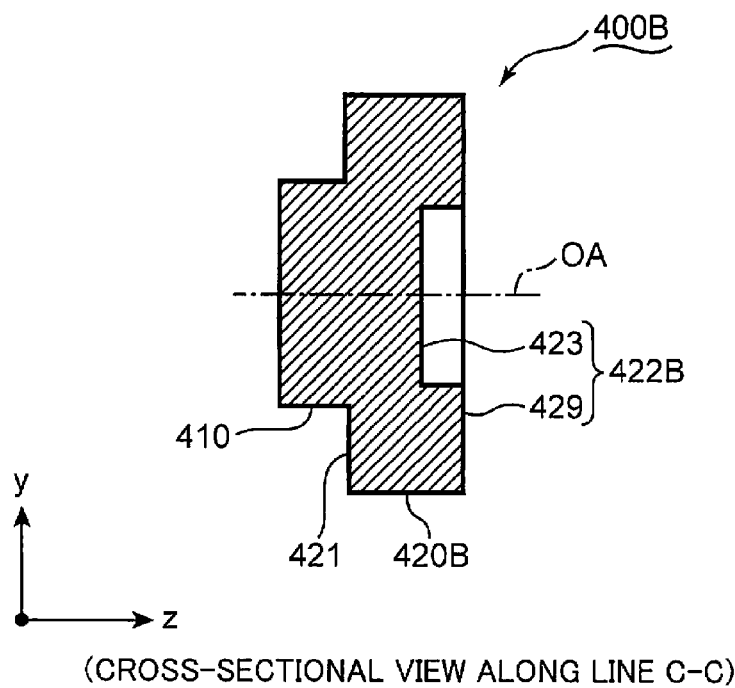
FIG. 9B is a schematic cross-sectional view of the detection lens along the line C-C shown in FIG. 9A.
Figure 9C:
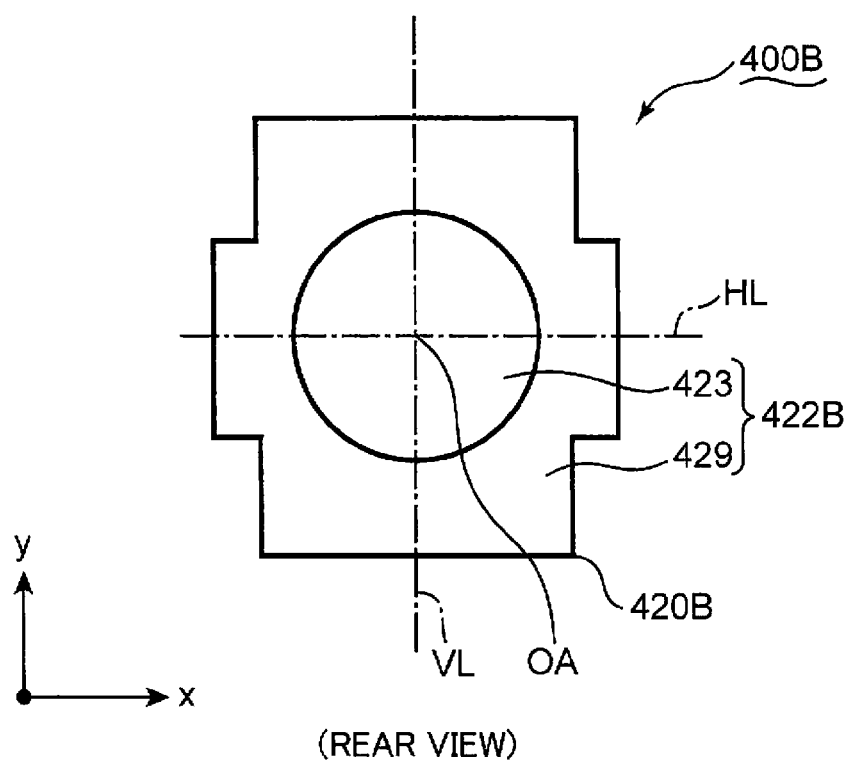
FIG. 9C is a schematic rear view of the detection lens shown in FIG. 9A.

FIG. 9A is a schematic front view of a detection lens 400B according to the third embodiment. FIG. 9B is a schematic cross-sectional view of the detection lens 400B along the line C-C shown in FIG. 9A. FIG. 9C is a schematic rear view of the detection lens 400B. The detection lens 400B is described with reference to FIGS. 1 and 9A to 9C. The same reference characters are used for indicating the same elements as those described in the first embodiment. Therefore, the description in the context of the first embodiment is employed to indicate the elements denoted by the same reference characters.

The detection lens 400B may be used as the detection lens 300 described with reference to FIG. 1.

Like the first embodiment, the detection lens 400B includes the lens portion 410. The detection lens 400B further includes a flange portion 420B to which the lens portion 410 is connected. Like the first embodiment, the flange portion 420B includes the first surface 421 to which the lens portion 410 is connected. The flange portion 420B further includes a second surface 422B opposite to the first surface 421. The detection lens 400B is different from the first embodiment in terms of the second surface 422B. The description of the first embodiment is employed to describe other features of the detection lens 400B.

The second surface 422B includes a concave region 423 opposite to the lens surface 411, and a surrounding region 429 surrounding the concave region 423. The concave region 423 is recessed in the surrounding region 429. A depth of the recess of the concave region 423 may be determined on the basis of a design of the optical path length between the lens surface 411 and the concave region 423. The flange portion 420B is formed into a cross shape under the dimensional relationship described in the context of the first embodiment. Therefore, advantageous effects described in the context of the first embodiment are obtained.

According to the principles of the present embodiment, in a lens molding process, a piece for forming the base 430 may be independently fabricated from a piece for forming the concave region 423. This may result in enhancement of surface accuracy of the concave region 423. A lens may be formed on the concave region 423 without a projection extending beyond the second surface 422B of the base 430. The lens formed on the concave region 423 may function as a concave lens or a convex lens. The concave region 423 may be flat. Various structures or surface forms may be constructed within the concave region 423, as long as there is no projection extending beyond the second surface 422B of the base 430.

Fourth Embodiment

Detection Lens

Figure 10A:
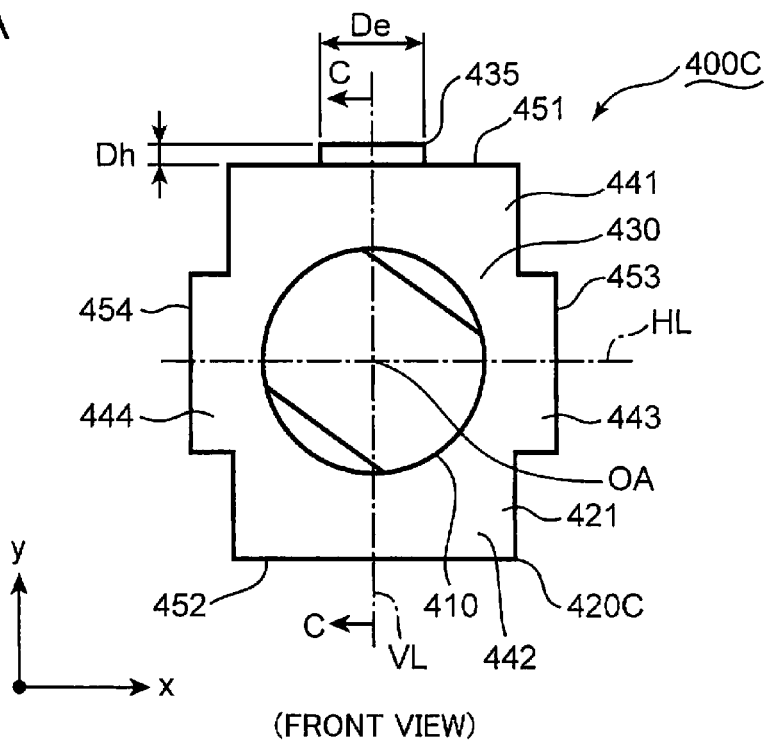
FIG. 10A is a schematic front view of a detection lens according to the fourth embodiment.
Figure 10B:
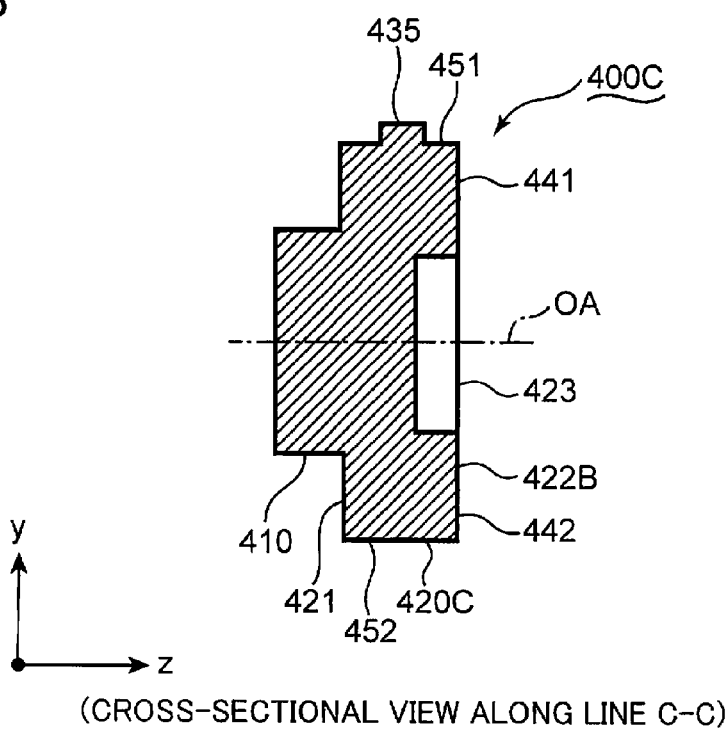
FIG. 10B is a schematic cross-sectional view of the detection lens along the line C-C shown in FIG. 10A.

FIG. 10A is a schematic front view of a detection lens 400C according to the fourth embodiment. FIG. 10B is a schematic cross-sectional view of the detection lens 400C along the line C-C shown in FIG. 10A. The detection lens 400C is described with reference to FIGS. 1, 10A and 10B. The same reference characters are used for indicating the same elements as those described in the first and third embodiments. Therefore, the description in the context of the third embodiment is employed to indicate the elements denoted by the same reference characters.

The detection lens 400C may be used as the detection lens 300 described with reference to FIG. 1.

Like the third embodiment, the detection lens 400C includes the lens portion 410. The detection lens 400C further includes a flange portion 420C to which the lens portion 410 is connected. Like the third embodiment, the flange portion 420C includes the first surface 421, to which the lens portion 410 is connected, and the second surface 422B, on which the concave region 423 is formed. Like the third embodiment, the flange portion 420C includes the base 430, the upper projection 441, the lower projection 442, the right projection 443 and the left projection 444. The flange portion 420C further includes a gate portion 435, which projects from the upper intersecting surface 451.

The detection lens 400C has the substantially cylindrical lens portion 410 and the substantially cross-shaped flange portion 420C. In compared to a conventional detection lens, the detection lens 400C is geometrically simple. Therefore, the detection lens 400C may be molded easily using resin molding techniques. The gate portion 435 corresponds to a gate of a mold apparatus through which molten resin is injected into a cavity in a mold used in resin molding. The principles of the present embodiment allow an operator to use the detection lens 400C without complete removal of the remaining gate portion 435. Therefore, the principles of the present embodiment makes the optical pickup device 100 described with reference to FIG. 1 inexpensive.

Once the gate portion 435 is removed, the flange portion 420C is formed to be point-symmetric around the optical axis OA. Therefore, the gate portion may project from the lower intersecting surface 452.

In FIG. 10A, the width of the gate portion 435 (i.e. the size in the x-axis direction) is denoted by "De". The projection length of the gate portion 435 from the upper intersecting surface 451 is denoted by "Dh".

(Lens Holder)

Figure 11A:
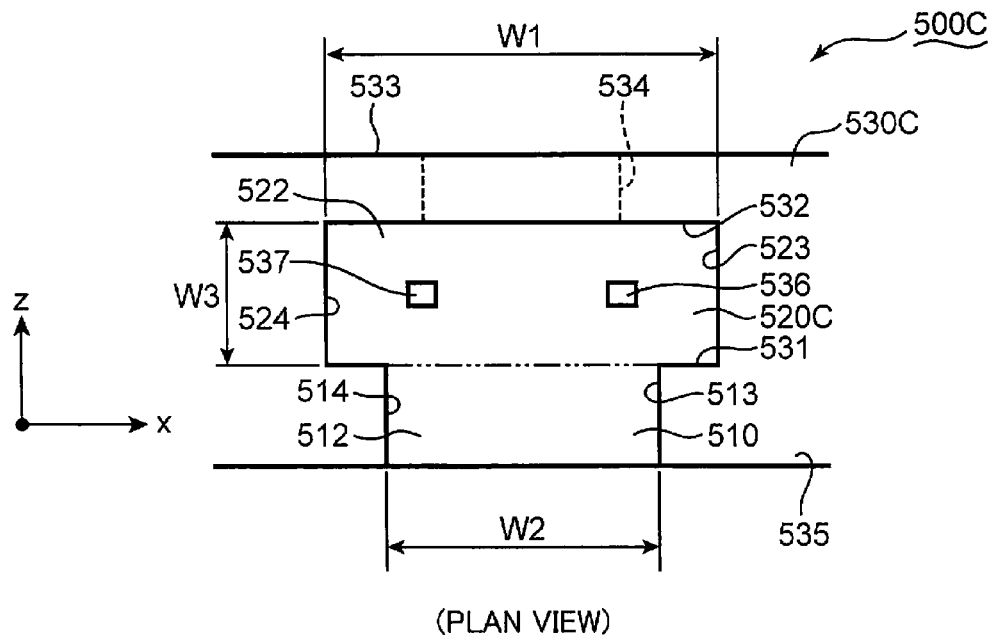
FIG. 11A is a schematic plan view of a lens holder configured to hold the detection lens shown in FIGS. 10A and 10B.
Figure 11B:
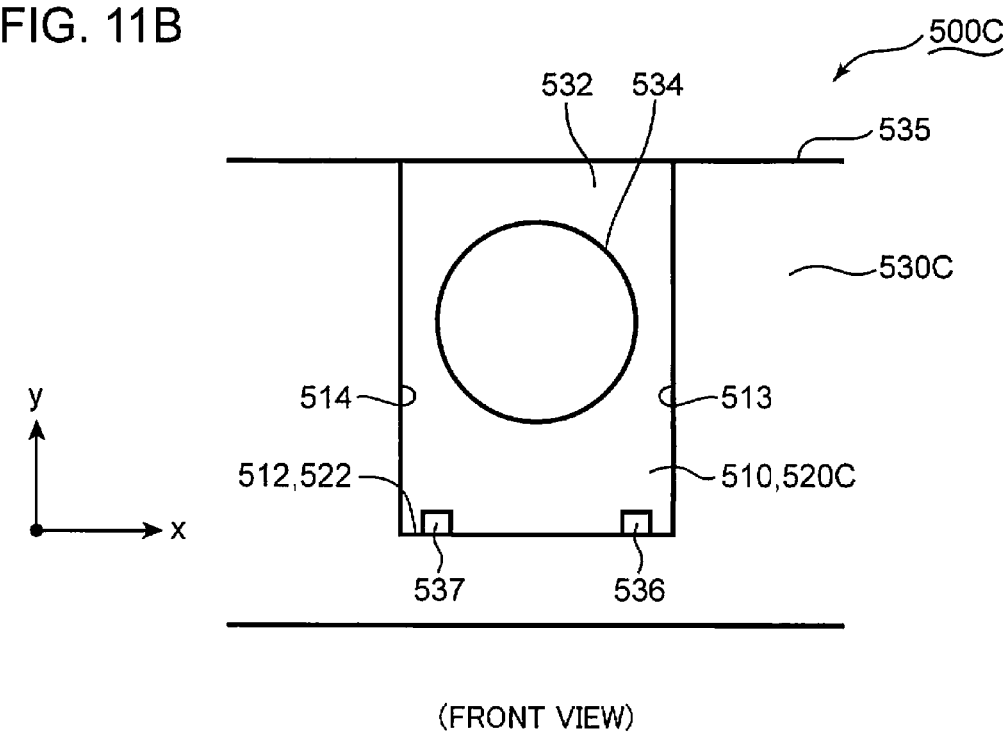
FIG. 11B is a schematic front view of the lens holder shown in FIG. 11A.

FIG. 11A is a schematic plan view of a lens holder 500C configured to hold the detection lens 400C. FIG. 11B is a schematic front view of the lens holder 500C. The lens holder 500C is described with reference to FIGS. 10A to 11B.

The lens holder 500C has a holding wall 530C to which the detection lens 400C is attached. Like the first embodiment, the holding wall 530C defines the lens chamber 510 into which the lens portion 410 is inserted. The holding wall 530C also defines a flange chamber 520C into which the flange portion 420C is inserted. In the present embodiment, the flange chamber 520C is exemplified as the first insertion space. The holding wall 530C is exemplified as the wall portion.

Like the first embodiment, the holding wall 530C includes the lower adjacent surface 522, the right adjacent surface 523, the left adjacent surface 524, the first adjacent surface 531, the second adjacent surface 532, the outer surface 533 and the upper surface 535. The holding wall 530C further includes a right pedestal 536, which projects upward from the lower adjacent surface 522, and a left pedestal 537, which projects upward from the lower adjacent surface 522 on the left of the right pedestal 536. The holding wall 530C is different from the first embodiment in terms of the right and left pedestals 536, 537. The description of the first embodiment is employed to describe other features of the holding wall 530C.

(Lens Unit)

Figure 12:
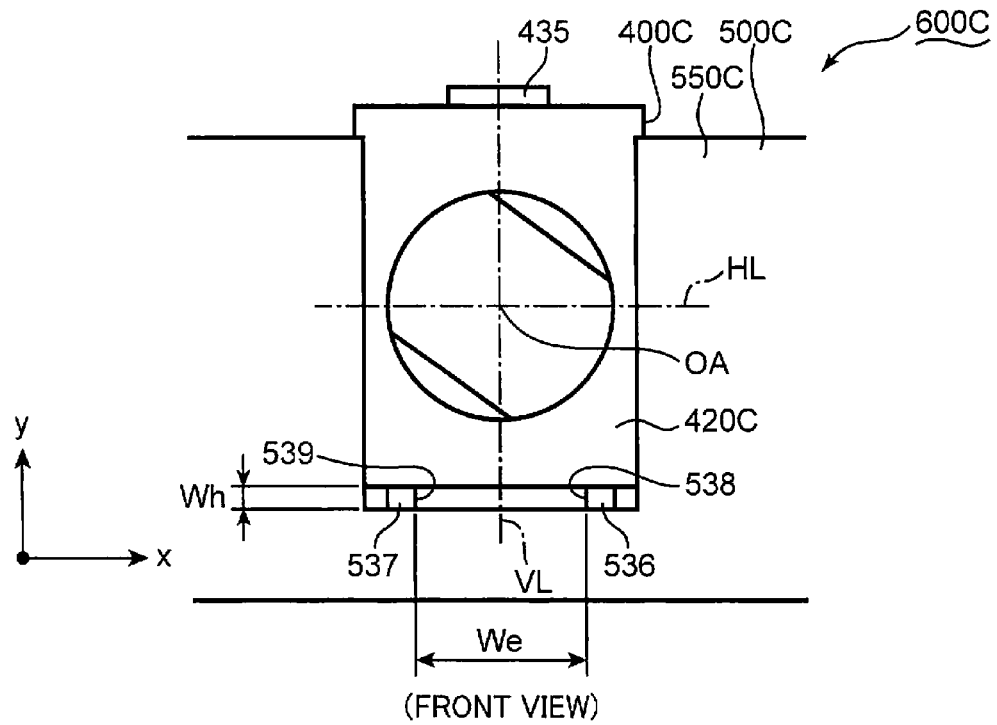
FIG. 12 is a schematic front view of a lens unit according to the fourth embodiment.

FIG. 12 is a schematic front view of a lens unit 600C. The lens unit 600C is described with reference to FIGS. 10A and 12.

The lens unit 600C includes the detection lens 400C and the lens holder 500C. The detection lens 400C shown in FIG. 12 is incorporated in the lens holder 500C at the normal rotational position.

The right and left pedestals 536, 537 project toward the flange portion 420C. In FIG. 12, the projection length of the right and left pedestals 536, 537 from the lower adjacent surface 522 is denoted by "Wh". In the present embodiment, one of the right and left pedestals 536, 537 is exemplified as the first pedestal. The other of the right and left pedestals 536, 537 is exemplified as the second pedestal.

The lens holder 500C is designed so that the projection length "Wh" of the right and left pedestals 536, 537 from the lower adjacent surface 522 is greater than the projection length "Dh" of the gate portion 435 from the upper intersecting surface 451. The relationship between the projection length "Wh" of the right and left pedestals 536, 537 and the projection length "Dh" of the gate portion 435 is expressed by the following inequality.

$$Wh > Dh \qquad \text{[Equation 6]}$$

The right pedestal 536 includes a left surface 538 facing the left pedestal 537. The left pedestal 537 includes a right surface 539 facing the left surface 538 of the right pedestal 536. In FIG. 12, the distance between the left and right surfaces 538, 539 is denoted by "We".

The lens holder 500C is designed so that the distance "We" between the left and right surfaces 538, 539 is longer than the width "De" of the gate portion 435. The relationship between the distance "We" between the left and right surfaces 538, 539 and the width "De" of the gate portion 435 is expressed by the following inequality.

$$We > De \qquad \text{[Equation 7]}$$

As shown in FIG. 12, if the detection lens 400C is attached to the lens holder 500C at the normal rotational position, the gate portion 435 is exposed from the lens holder 500C. Because the gate portion 435 and the lens holder 500C do not interfere with each other, the gate portion 435 does not have to be removed.

Figure 13:
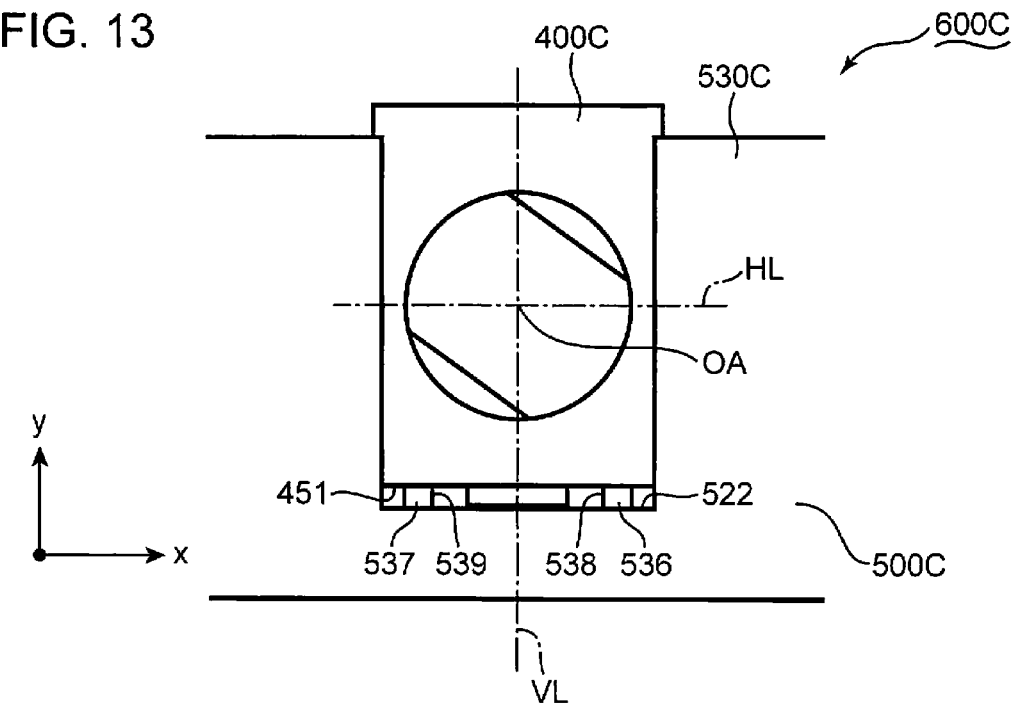
FIG. 13 is a front view of the lens unit shown in FIG. 12.

FIG. 13 is a front view of the lens unit 600C. The lens unit 600C is further described with reference to FIGS. 10A, 12 and 13.

The detection lens 400C shown in FIG. 13 is rotated by 180° from the normal rotational position, and then incorporated in the lens holder 500C. Consequently, the gate portion 435 is positioned near the lower adjacent surface 522. Because the projection length "Wh" of the right and left pedestals 536, 537 from the lower adjacent surface 522 is set at a value greater than the projection length "Dh" of the gate portion 435 from the upper intersecting surface 451, the gate portion 435 does not interfere with the lower adjacent surface 522.

Because the distance "We" between the left surface 538 of the right pedestal 536 and the right surface 539 of the left pedestal 537 is longer than the width "De" of the gate portion 435, the right and left pedestals 536, 537 may define a space to allow insertion of the gate portion 435 of the detection lens 400C which is rotated by 180° from the normal rotational position (the rotational position of the detection lens 400C shown in FIG. 12). If the detection lens 400C is rotated by 180° from the normal rotational position and then inserted into the lens holder 500C, the left and right surfaces 538, 539 face the gate portion 435. The right and left pedestals 536, 537 come into contact with the upper intersecting surface 451 without interfering with the gate portion 435. Therefore, the detection lens 400C is supported appropriately by the lens holder 500C. In the present embodiment, one of the right and left surfaces 538, 539 is exemplified as the first facing surface. The other of the right and left surfaces 538, 539 is exemplified as the second facing surface.

It is preferable that the gate portion does not project from the right or left intersecting surface. If the gate portion projects from the right or left intersecting surface, the lens holder has to be structured to avoid interference with the gate portion. This structure makes it difficult to position the detection lens in the x-axis direction. Because the distance between the right intersecting surface and the right adjacent surface or the distance between the left intersecting surface and the left adjacent surface increases, more adhesive needs to be applied in order to fix the detection lens to the lens holder. This may results in an increase in a displacement amount of the detection lens caused by a change in a temperature of the detection lens. However, this problem is less likely to happen if the gate portion 435 projects from the upper or lower intersecting surface 451, 452 as described above.

As described above, the detection lens 400C is placed in the lens holder 500C at the normal rotational position or at 180° from the normal rotational position without interference between the gate portion 435 and the lens holder 500C. Therefore, an operator does not have to pay attention to a direction of the detection lens 400C. For instance, the operator may correctly incorporate the detection lens 400C in the lens holder 500C without observing an enlarged image using a microscope. The flange portion 420C is formed into a substantially cross shape, like the first to third embodiments. Accordingly, the detection lens 400C is fixed to the lens holder 500C in accordance with the same adhesive technologies as that described in the first to third embodiments. Consequently, even in an environment in which a temperature of the detection lens changes, there is little displacement of the detection lens 400C with respect to the lens holder 500C. Even in an environment in which an impact is applied to the lens holder 500C, the detection lens 400C is less likely to fall off from the lens holder 500C.

(Pedestal)

FIGS. 14A to 14D are schematic plan views of the lens holder 500C. Various designs for the pedestals (the right and right pedestals 536, 537) are described with reference to FIGS. 14A to 14D.

(First Design Pattern)

Figure 14A:
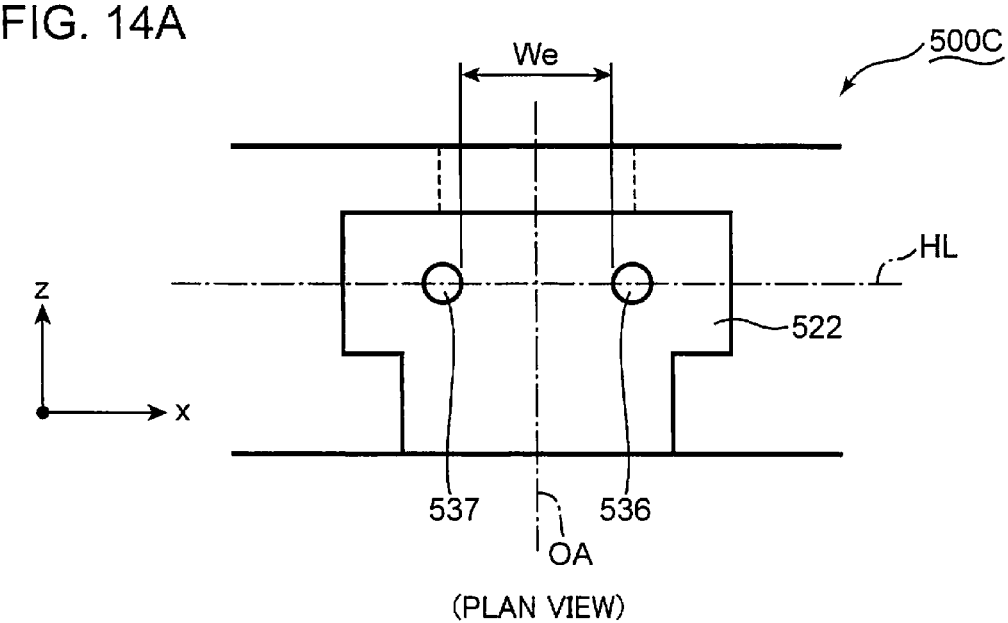
FIG. 14A is a schematic view of an exemplary design pattern of the lens holder according to the fourth embodiment.

FIG. 14A shows a first design pattern for the pedestals. The right and left pedestals 536, 537 may be cylindrical columns projecting from the lower adjacent surface 522.

(Second Design Pattern)

Figure 14B:
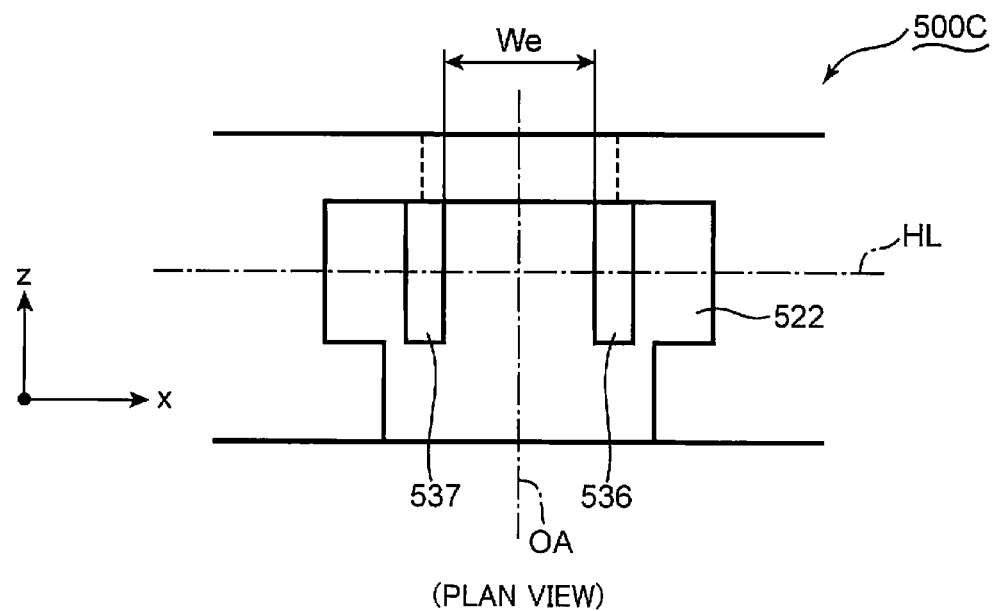
FIG. 14B is a schematic view of an exemplary design pattern of the lens holder according to the fourth embodiment.

FIG. 14B shows a second design pattern for the pedestals. The right and left pedestals 536, 537 may be rectangular columns projecting from the lower adjacent surface 522.

(Third Design Pattern)

Figure 14C:
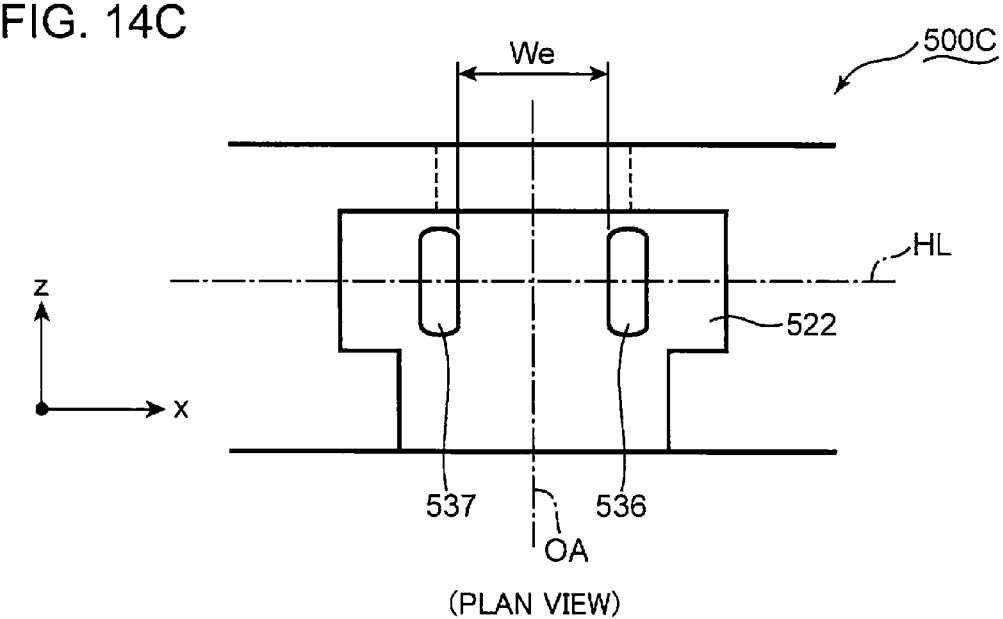
FIG. 14C is a schematic view of an exemplary design pattern of the lens holder according to the fourth embodiment.

FIG. 14C shows a third design pattern for the pedestals. The right and left pedestals 536, 537 may be elliptic columns projecting from the lower adjacent surface 522.

(Fourth Design Pattern)

Figure 14D:
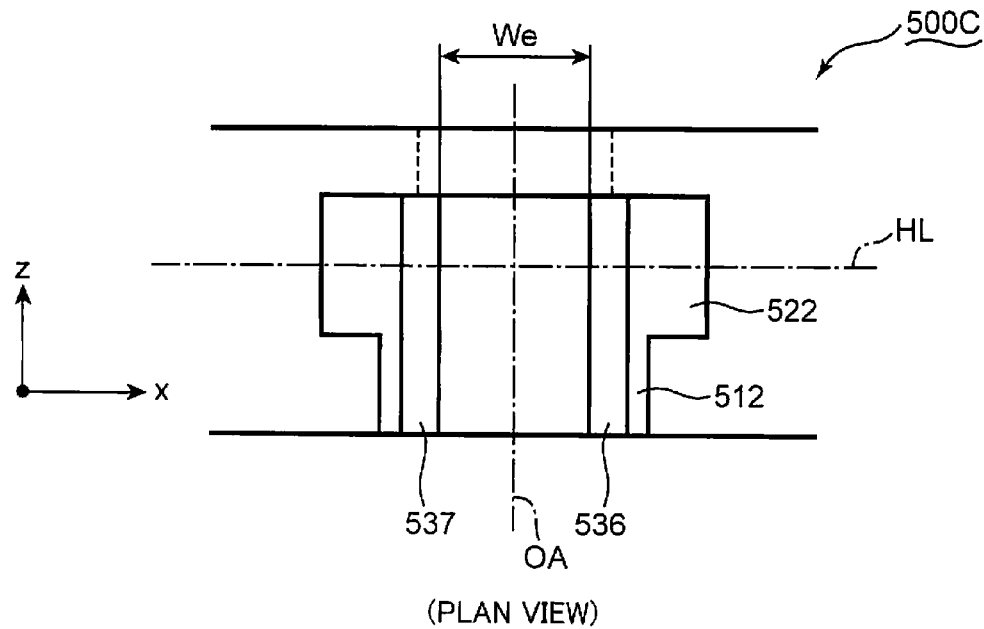
FIG. 14D is a schematic view of an exemplary design pattern of the lens holder according to the fourth embodiment.

FIG. 14D shows a fourth design pattern for the pedestals. The right and left pedestals 536, 537 may be ribs extending from the lower adjacent surface 522 to the inner bottom surface 512.

As described above, various design patterns are applied to the pedestals. According to the first to fourth design patterns, the right and left pedestals 536, 537 are designed so that the relationships expressed by the inequalities shown in Equations 6 and 7 are satisfied. The right and left pedestals 536, 537 may be integrated with the lower adjacent surface 522 (and the inner bottom surface 512). Alternatively, the right and left pedestals 536, 537 may be members different from the lower adjacent surface 522 (and the inner bottom surface 512). In this case, the right and left pedestals 536, 537 are fixed to the lower adjacent surface 522 (and the inner bottom surface 512) using adhesive or other appropriate method.

Fifth Embodiment

Figure 15:
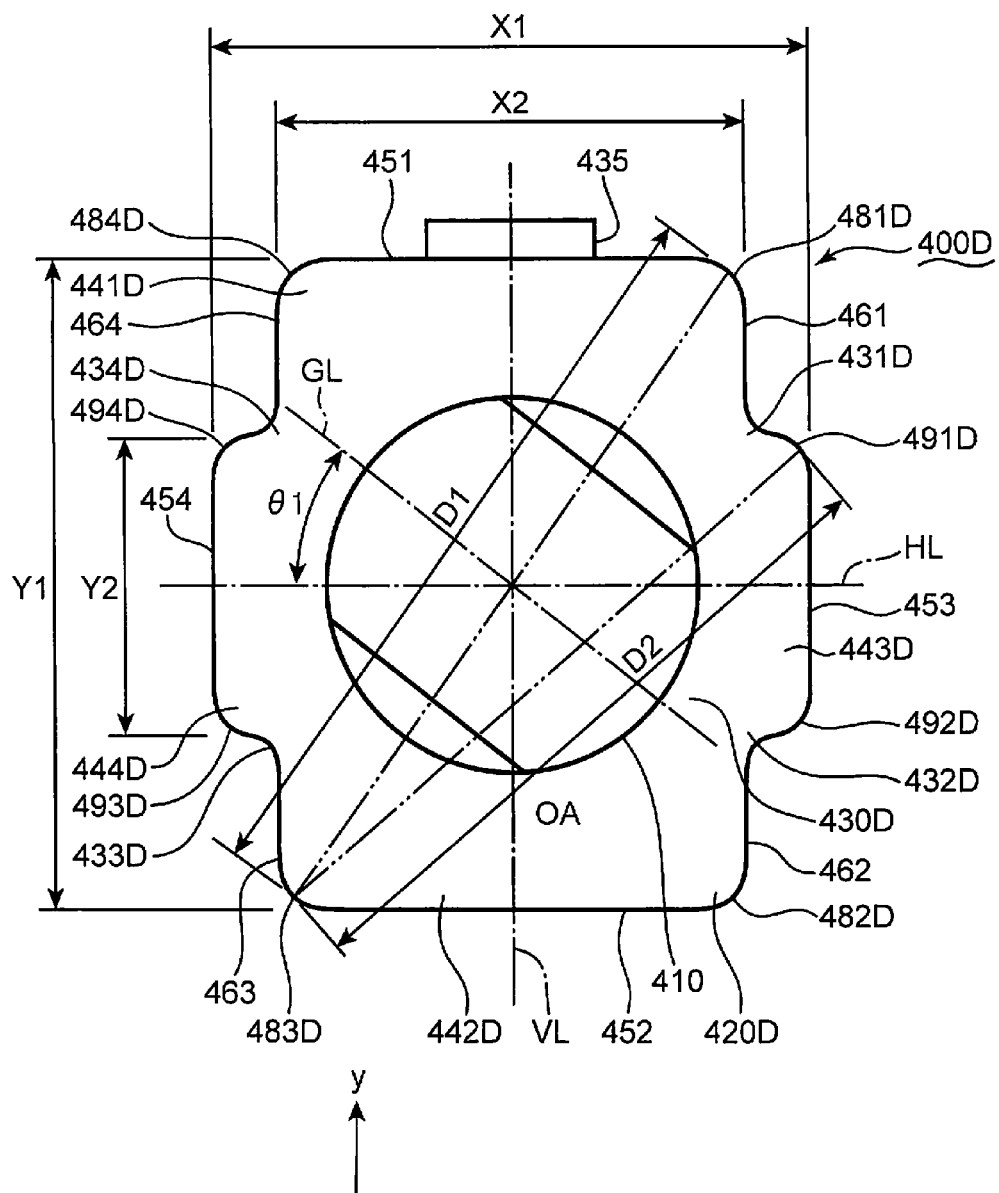
FIG. 15 is a schematic front view of a detection lens according to the fifth embodiment.

FIG. 15 is a schematic front view of a detection lens 400D according to the fifth embodiment. The detection lens 400D is described with reference to FIG. 15. The same reference characters are used for indicating the same elements as those described in the fourth embodiment. Therefore, the description in the context of the fourth embodiment is employed to indicate the elements denoted by the same reference characters.

Like the fourth embodiment, the detection lens 400D includes the lens portion 410. The detection lens 400D further includes a flange portion 420D to which the lens portion 410 is connected. Like the fourth embodiment, the flange portion 420D includes the gate portion 435. The flange portion 420D also includes a base 430D, an upper projection 441D, which projects upward from the base 430D, a lower projection 442D, which projects downward from the base 430D, a right projection 443D, which projects to the right from the base 430D, and a left projection 444D, which projects to the left from the base 430D.

The base 430D includes a first reentrant corner 431D curved between the upper and right projections 441D, 443D, a second reentrant corner 432D curved between the right and lower projections 443D, 442D, a third reentrant corner 433D curved between the lower and left projections 442D, 444D, and a fourth reentrant corner 434D curved between the left and upper projections 444D, 441D.

Like the fourth embodiment, the upper projection 441D includes the upper intersecting surface 451 and the vertical surfaces 461, 464. Unlike the fourth embodiment, the upper projection 441D includes a corner 481D curved between the upper intersecting surface 451 and the vertical surface 461. The upper projection 441D also includes a corner 484D curved between the upper intersecting surface 451 and the vertical surface 464.

Like the fourth embodiment, the right projection 443D includes the right intersecting surface 453. The right projection 443D includes a corner 491D curved at an upper end of the right intersecting surface 453, and a corner 492D curved at a lower end of the right intersecting surface 453. The outline from the first reentrant corner 431D to the corner 491D in the right projection 443D is curved into a substantially S-shape. The outline from the second reentrant corner 432D to the corner 492D in the right projection 443D is curved into a substantially S-shape.

Like the fourth embodiment, the lower projection 442D includes the lower intersecting surface 452 and the vertical surfaces 462, 463. Unlike the fourth embodiment, the lower projection 442D includes a corner 482D curved between the lower intersecting surface 452 and the vertical surface 462. The lower projection 442D also includes a corner 483D curved between the lower intersecting surface 452 and the vertical surface 463.

Like the fourth embodiment, the left projection 444D includes the left intersecting surface 454. The left projection 444D includes a corner 493D curved at a lower end of the left intersecting surface 454, and a corner 494D curved at an upper end of the left intersecting surface 454. The outline from the third reentrant corner 433D to the corner 493D in the left projection 444D is curved into a substantially S-shape. The outline from the fourth reentrant corner 434D to the corner 494D in the left projection 444D is curved into a substantially S-shape.

The corners 481D, 482D, 483D, 484D, 491D, 492D, 493D, 494D are curved to cause little chipping of the detection lens 400D. The first to fourth reentrant corners 431D, 432D, 433D, 434D are also curved to cause little cracking of the detection lens 400D.

According to the present embodiment, all the corners of the flange portion 420D are curved. Alternatively, only some of the corners may be curved.

The equations for the dimensional values "D1" and "D3" described in the context of the first embodiment may be applied to the flange portion 420D as well. When the dimensional values "X1", "Y1", "X2" and "Y2" used in the equations for the dimensional values "D1" and "D3" decrease by a curvature of the corners, the dimensional values "D1" and "D3" are calculated appropriately. Therefore, according to the principles described in the context of the first embodiment, the detection lens 400D is less likely to be inserted into the lens holder at a wrong angle.

In the present embodiment, the corners of the flange portion 420D are curved. Alternatively, the corners of the flange portion may be chamfered.

Sixth Embodiment

Figure 16:
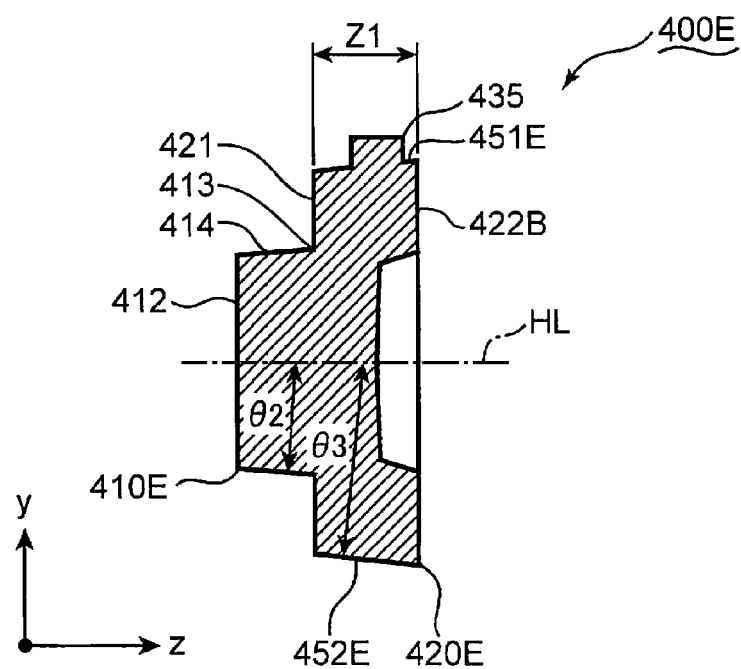
FIG. 16 is a schematic front view of a detection lens according to the sixth embodiment.

FIG. 16 is a schematic front view of a detection lens 400E according to the sixth embodiment. The detection lens 400E is described with reference to FIGS. 1, 3A and 16. The same reference characters are used for indicating the same elements as those described in the first, third and fifth embodiments. Therefore, the description in the context of the first, third and fifth embodiments is employed to indicate the elements denoted by the same reference characters.

The detection lens 400E includes a lens portion 410E and a flange portion 420E to which the lens portion 410E is connected. The lens portion 410E includes a distal surface 412, which is provided with the lens surface described with reference to the first embodiment, a base end 413, which is connected to the flange portion 420E, and a circumferential surface 414 formed between the distal surface 412 and the base end 413. The circumferential surface 414 tapers from the base end 413 toward the distal surface 412. In FIG. 16, the taper angle of the circumferential surface 414 is denoted by "θ2."

Like the third embodiment, the flange portion 420E includes the first and second surfaces 421, 422B. Like the fifth embodiment, the flange portion 420E further includes the gate portion 435. The flange portion 420E includes an upper intersecting surface 451E, on which the gate portion 435 is formed, and a lower intersecting surface 452E opposite to the upper intersecting surface 451E. The upper and lower intersecting surfaces 451E, 452E form a tapered shape by tapering toward the lens portion 410E. In FIG. 16, the taper angle formed by the upper and lower intersecting surfaces 451E, 452E is denoted by "θ3."

Except for the tapering structure created by the circumferential surface 414, the upper and lower intersecting surfaces 451E, 452E and other features of the detection lens 400E are the same as those described in the aforementioned various embodiments. Therefore, the detection lens 400E may be inserted into the lens holder 500 described with reference to FIG. 3A.

The taper angles "θ2" and "θ3" may be set within a range of 1° to 6°. When the detection lens 400E has the taper angles "θ2" and "θ3" set within this angular range, the detection lens 400E may be easily molded using known resin molding techniques.

In FIG. 16, the distance between the first and second surfaces 421, 422B (i.e. the thickness of the flange portion 420E in the z-axis direction) is denoted by "Z1." The thickness "Z1" of the flange portion 420E and the thickness "W3" of the flange chamber 520 may be appropriately set in consideration of positional variations of the flange portion 420E in the flange chamber 520 and rotation of the flange portion 420E around the y-axis (e.g. these thicknesses may be set within a range in which positional variations of the flange portion 420E in the flange chamber 520 and rotation of the flange portion 420E around the y-axis do not significantly deteriorate performance of the detection lens 400E). An inclination of the detection lens 400E may be kept in an allowable range as long as the dimensional values "Z1" and "W3" are set at appropriate values.

The dimensional value "Y2" described with reference to FIG. 2 may be set within a range of 3.5 mm to 4.5 mm. In this case, the dimensional values "Z1" and "W3" may be set so that the relationship expressed by the following inequality is satisfied.

$$0 \leq W3 - Z1 < 1 \quad \text{[Equation 8]}$$

When the relationship expressed by this inequality is satisfied, rotation of the detection lens 400E around the y-axis is kept within a range of approximately 1° to 2°. As long as rotation of the detection lens 400E around the y-axis is kept within this range, performance of the optical pickup device 100 may be kept at a high level.

The following equations show optimal values for the dimensional values used in the aforementioned various embodiments. It should be noted that the principles of the present embodiment are not limited to the following dimensional values.

$$X1 \cong 3.6 \text{ mm}$$

$$X2 \cong 3.0 \text{ mm}$$

$$Y1 \cong 4.0 \text{ mm}$$

$$Y2 \cong 2.0 \text{ mm}$$

$$Da \cong 2.3 \text{ mm}$$

$$Z1 \cong 1.0 \text{ mm} \quad \text{[Equation 9]}$$

The aforementioned various lens units are preferably mounted on the optical pickup device 100 described with reference to FIG. 1. Alternatively, these various lens units may be loaded in another type of optical pickup device. The lens units constructed according to the principles of the various embodiments are loaded in the optical pickup device to perform focus control on the basis of astigmatic methods. Therefore, information processes (recording and/or reproduction) are executed to accomplish the aforementioned various advantageous effects.

The optical pickup device 100 described with reference to FIG. 1 is equipped with the optical disc (BD) 210, the optical disc (DVD) 220 and the optical disc (CD) 230. The optical pickup device 100 may execute optical information processes for all of them. Alternatively, the principles of the various embodiments may be applied to other optical pickup devices compatible with BDs, which require very accurate detection lens, if the optical pickup devices are selectively compatible with DVDs and CDs. It may be preferable that the aforementioned principles are applied to, for example, optical pickup devices compatible with BDs and DVDs.

The detection lenses described in the context of the various embodiments are substantially point-symmetric. Therefore, it is easy to mold detection lenses using resin molding techniques. In addition, the obtained detection lenses may have a high level of performance. Without excessive attention, an operator may correctly incorporate such detection lenses in the optical pickup device. Because the detection lenses are made sufficiently sturdy, high positional accuracy may be maintained even in an environment of a temperature change of the detection lenses or an environment of an impact. Accordingly, the principles of the various embodiments may not only contribute to production of an inexpensive optical pickup device but also improve performance of the optical pickup device.

Seventh Embodiment

Optical Disc Device

Figure 17:
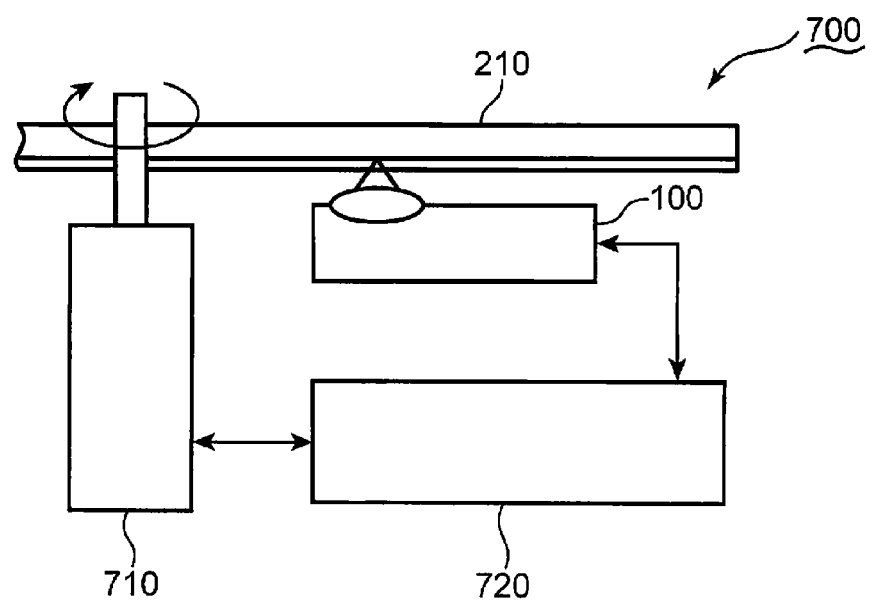
FIG. 17 is a schematic view of an optical disc device according to the seventh embodiment.

FIG. 17 is a schematic view of an optical disc device 700 according to the seventh embodiment. The optical disc device 700 is described with reference to FIGS. 1 and 17. The same reference characters are used for indicating the same elements as those described in the first embodiment. Therefore, the description in the context of the first embodiment is employed to indicate the elements denoted by the same reference characters.

The optical disc device 700 includes the optical pickup device 100, a driver 710 for driving the optical disc (BD) 210, and a controller 720 for controlling the optical pickup device 100 and the driver 710. The optical disc (BD) 210 shown in FIG. 17 may be replaced with the optical disc (DVD) 220 or the optical disc (CD) 230. The driver 710 may be a motor configured to rotate the optical disc (BD) 210. The controller 720 processes control signals generated by the optical pickup device 100 and information signals containing information to be processed by the optical pickup device 100. In addition, the controller 720 functions as an interface for communicating the information signals between an external device and the optical disc device 700.

As described with reference to FIG. 1, the optical pickup device 100 loaded in the optical disc device 700 includes a light source compatible with plural optical discs. Thus, the optical disc device 700 may preferably reproduce information from each of the optical discs. The optical disc device 700 may preferably record information in each of the optical discs.

Eighth Embodiment

Computer

Figure 18:
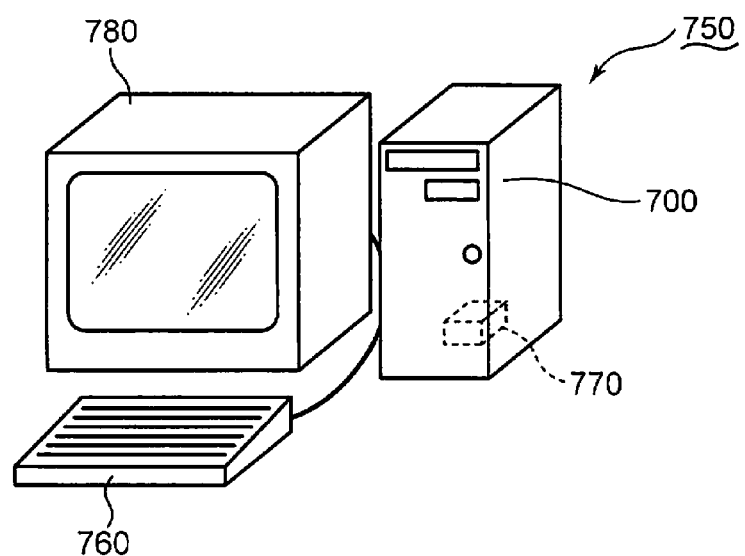
FIG. 18 is a schematic view of a computer according to the eighth embodiment.

FIG. 18 is a schematic view of a computer 750 according to the eighth embodiment. The computer 750 is described with reference to FIGS. 17 and 18. The same reference characters are used for indicating the same elements as those described in the seventh embodiment. Therefore, the description in the context of the seventh embodiment is employed to indicate the elements denoted by the same reference characters.

The computer 750 includes the optical disc device 700, an input device 760, an arithmetic device 770 and an output device 780. A keyboard is shown as the input device 760 in FIG. 18. Alternatively or additionally, a mouse or a touch panel may be used as the input device 760. A user may use the input device 760 to input information into the computer 750. The input device 760 may output information which is input to the arithmetic device 770. In the present embodiment, the input device 760 is exemplified as the input portion.

The arithmetic device 770 performs arithmetic processes on information which is input through the input device 760. The arithmetic device 770 performs arithmetic processes on information which is reproduced from the optical disc by the optical disc device 700. The arithmetic device 770 outputs arithmetic results obtained in the arithmetic processes to the output device 780. A central processing unit (CPU) of a typical computer is exemplified as the arithmetic device 770. In the present embodiment, the arithmetic device 770 is exemplified as the computing portion.

The output device 780 displays information, which is input through the input device 760, reproduction information, which is reproduced from the optical disc by the optical disc device 700, and arithmetic results which are output by the arithmetic device 770. Various devices such as a Braun tube, a liquid crystal display, a display unit with an organic EL device, a plasma display unit and a printer may be exemplified as the output device 780. In the present embodiment, the output device 780 is exemplified as the output portion.

Because the computer 750 includes the optical disc device 700 described in the context of the seventh embodiment, the computer 750 may preferably perform recording processes and/or reproduction processes on different types of optical discs. Thus, the computer 750 may be used in a variety of applications.

Ninth Embodiment

Optical Disc Player

Figure 19:
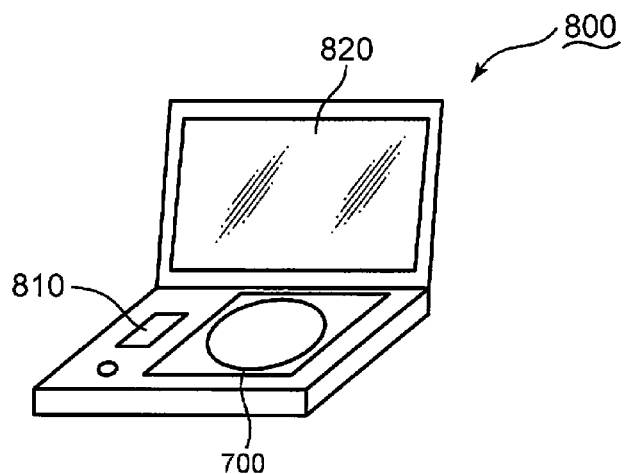
FIG. 19 is a schematic view of an optical disc player according to the ninth embodiment.

FIG. 19 is a schematic view of an optical disc player 800 according to the ninth embodiment. The optical disc player 800 is described with reference to FIGS. 17 and 19. The same reference characters are used for indicating the same elements as those described in the seventh embodiment. Therefore, the description in the context of the seventh embodiment is employed to indicate the elements denoted by the same reference characters.

The optical disc player 800 includes the optical disc device 700 and a converter 810. The optical disc device 700 may reproduce information from the optical disc and output information signals corresponding to the reproduced information to the converter 810. The converter 810 converts the information signals output from the optical disc device 700 into image signals. In other words, the converter 810 converts information stored in the optical disc into image information. A general decoder may be used as the converter 810. In the present embodiment, the converter 810 is exemplified as the image information generator.

The optical disc player 800 may have a position sensor (not shown) such as a GPS, and a central processing unit (CPU, not shown). When the optical disc player 800 includes a position sensor or central processing unit, the optical disc player 800 may be used as an automotive navigation system.

Optionally, the optical disc player 800 may include a display device 820 such as an LCD monitor, as shown in FIG. 19. The display device 820 may display reproduction information reproduced from the optical disc by the optical disc device 700 as well as other information.

Because the optical disc player 800 includes the optical disc device 700 described in the context of the seventh embodiment, the optical disc player 800 may preferably perform recording processes and/or reproduction processes on different types of optical discs. Thus, the optical disc player 800 may be used in a variety of applications.

Tenth Embodiment

Optical Disc Recorder

Figure 20:
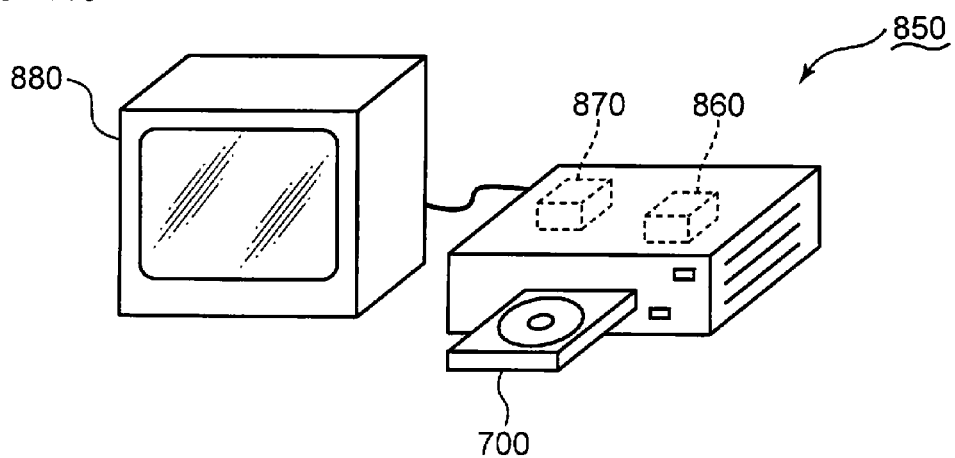
FIG. 20 is a schematic view of an optical disc recorder according to the tenth embodiment.
Figure 21:
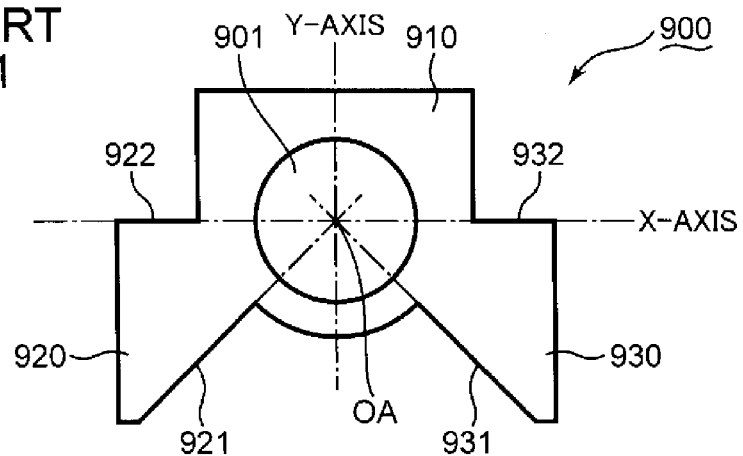
FIG. 21 is a schematic front view of a conventional lens holder.
Figure 22A:
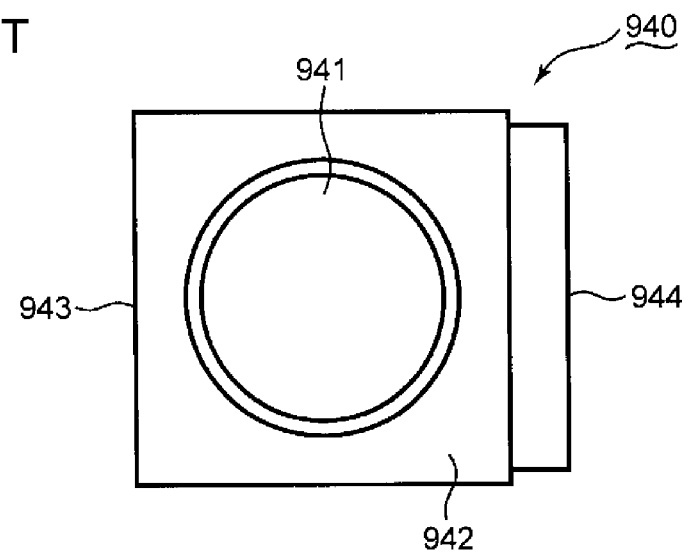
FIG. 22A is a schematic front view of a conventional lens.
Figure 22B:
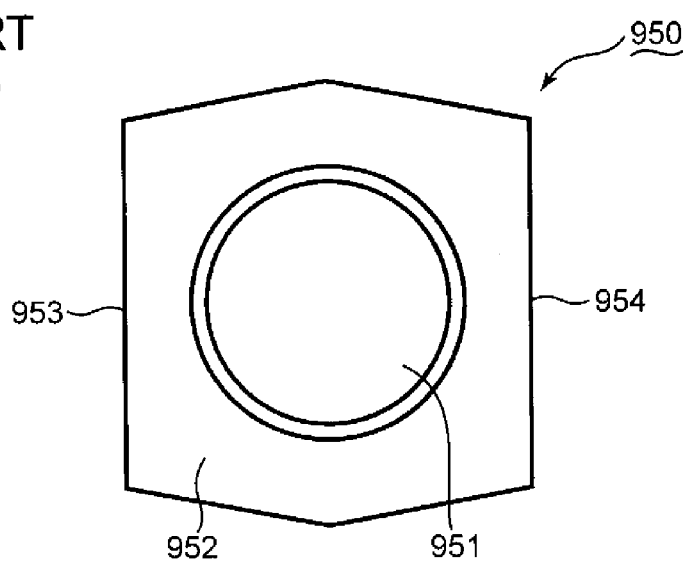
FIG. 22B is a schematic front view of the conventional lens.
Figure 23A:
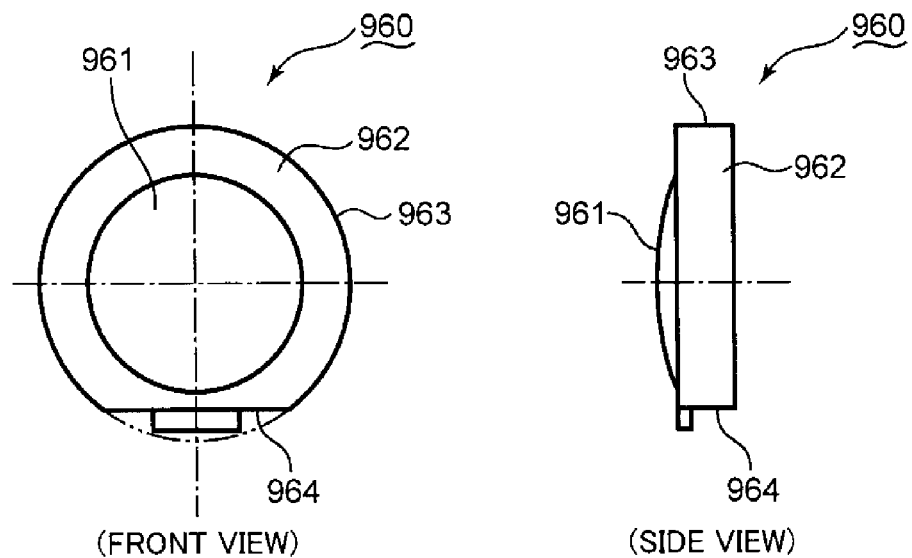
FIG. 23A shows schematic front and side views of the conventional lens.
Figure 23B:
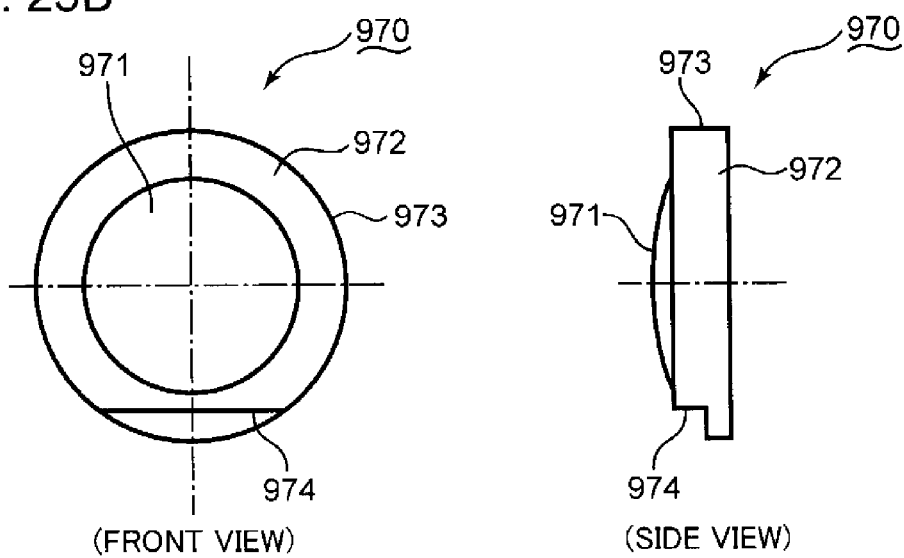
FIG. 23B shows schematic front and side views of the conventional lens.

FIG. 20 is a schematic view of an optical disc recorder 850 according to the tenth embodiment. The optical disc recorder 850 is described with reference to FIGS. 17 and 20. The same reference characters are used for indicating the same elements as those described in the seventh embodiment. Therefore, the description in the context of the seventh embodiment is employed to indicate the elements denoted by the same reference characters.

The optical disc recorder 850 includes the optical disc device 700, a first converter 860, a second converter 870 and an output device 880. The first converter 860 converts image information into information signals. The optical disc device 700 records the information signals output from the first converter 860 in an optical disc. A general encoder may be used as the first converter 860. In the present embodiment, the first converter 860 is exemplified as the information signal generator.

The optical disc device 700 may perform reproduction processes on the optical disc and output resultant reproduced signals to the second converter 870. The second converter 870 converts the reproduced signals to image information and outputs the image information to the output device 880. Accordingly, the image information recorded in the optical disc may be reproduced appropriately. The second converter 870 may be a general decoder. Various devices such as a Braun tube, a liquid crystal display, a display unit with an organic EL device, a plasma display unit and a printer may be exemplified as the output device 880.

Because the optical disc recorder 850 includes the optical disc device 700 described in the context of the seventh embodiment, the optical disc recorder 850 may appropriately perform recording processes and/or reproduction processes on different types of optical discs. Thus, the optical disc recorder 850 may be used in a variety of applications.

The various techniques described in the context of the embodiments mainly have the following features.

A detection lens according to one aspect of the aforementioned embodiments has a lens portion, and a flange portion including a first surface, to which the lens portion is connected, and a second surface opposite to the first surface. The flange portion includes a base disposed along an optical axis of the lens portion, a first projection, which projects along a first axis orthogonal to the optical axis, a second projection, which is point-symmetric to the first projection around the optical axis and projects from the base, a third projection, which projects along a second axis orthogonal to the optical axis and the first axis, and a fourth projection, which is point-symmetric to the third projection around the optical axis and projects from the base. The flange portion does not have a projection which extends beyond the second surface. The first projection includes a first intersecting surface which intersects with the first axis. The second projection includes a second intersecting surface which intersects with the first axis. The third projection includes a third intersecting surface which intersects with the second axis. The fourth projection includes a fourth intersecting surface which intersects with the second axis. A first distance between the first and second intersecting surfaces is longer than a second distance between the third and fourth intersecting surfaces.

According to the aforementioned configuration, since the lens portion is connected to the first surface, the lens portion projects from the first surface. On the other hand, the flange portion does not have a projection which extends beyond the second surface. Accordingly, an operator may correctly install the detection lens with respect to a direction along the optical axis.

The second projection is point-symmetric to the first projection around the optical axis and projects from the base. The fourth projection is point-symmetric to the third projection around the optical axis and projects from the base. Because the first distance between the first and second intersecting surfaces is longer than the second distance between the third and fourth intersecting surfaces, an operator may correctly install the detection lens with respect to a rotational position around the optical axis.

In the aforementioned configuration, the flange portion may include a gate portion which projects from the first or second intersecting surface.

According to the aforementioned configuration, because the flange portion includes the gate portion which projects from the first or second intersecting surface, it is not necessary to completely eliminate the whole gate portion during processes of molding the detection lens. Therefore, processes of producing the detection lens may be simplified.

In the aforementioned configuration, the lens portion may include a first lens surface which causes astigmatism.

According to the aforementioned configuration, because the lens portion includes a first lens surface which causes astigmatism, various optical data may be acquired by means of the astigmatism of the first lens surface.

In the aforementioned configuration, the first lens surface may have a first curvature in a direction along a generatrix of the first lens surface and a second curvature, which is different from the first curvature, in a direction orthogonal to the generatrix.

According to the aforementioned configuration, because the first curvature is different from the second curvature, various optical data may be acquired by means of the astigmatism of the first lens surface.

In the aforementioned configuration, the base may include an opposite surface which is opposite to the first lens surface. The opposite surface may include a second lens surface of which optical axis is common with the lens portion.

According to the aforementioned configuration, various optical processes may be performed by means of the first and second lens surfaces.

A lens unit according to another aspect of the aforementioned embodiments has the detection lens and a lens holder which holds the detection lens. The lens holder includes a wall portion defining a first insertion space, into which the flange portion is inserted, and a second insertion space, into which the lens portion is inserted. A relationship expressed by an inequality of Y1>W1>X1>W2>Da is satisfied, where Y1 represents the first distance, X1 represents the second distance, Da represents a width of the lens portion along the first axis, W1 represents a width of the first insertion space along the first axis, and W2 represents a width of the second insertion space along the first axis.

According to the aforementioned configuration, because the relationship expressed by the inequality of Y1>W1>X1>W2>Da is satisfied, an operator may correctly insert the detection lens into the lens holder.

A lens unit according to another aspect of the aforementioned embodiments has the detection lens and a lens holder which holds the detection lens. The lens holder includes a wall portion defining a first insertion space, into which the flange portion is inserted, and a second insertion space, into which the lens portion is inserted, a first pedestal that projects toward the flange portion in the first insertion space, and a second pedestal defining a space, into which the gate portion is inserted, together with the first pedestal. A relationship expressed by an inequality of Y1>W1>X1>W2>Da is satisfied, where Y1 represents the first distance, X1 represents the second distance, Da represents a width of the lens portion along the first axis, W1 represents a width of the second insertion space along the first axis, and W2 represents a width of the second insertion space along the first axis. The first pedestal includes a first facing surface which faces the gate portion. The second pedestal includes a second facing surface which faces the gate portion. A relationship expressed by an inequality of We>De and a relationship expressed by an inequality of Wh>Dh are satisfied, where We represents a distance between the first and second facing surfaces, Wh represents a projection length of the first and second pedestals in the first insertion space, and Dh represents a projection length of the gate portion from the first or second intersecting surface.

According to the aforementioned configuration, because the relationship expressed by the inequality of We>De and the relationship expressed by the inequality of Wh>Dh are satisfied, an operator may correctly insert the detection lens into the lens holder.

In the aforementioned configuration, the first projection may include a first projection surface which extends from the third projection toward the first intersecting surface to define a first corner together with the first intersecting surface. The second projection may include a second projection surface which extends from the fourth projection toward the second intersecting surface to define a second corner together with the second intersecting surface. A relationship expressed by an inequality of D1>W1 may be satisfied, where D1 represents a distance between the first and second corners.

According to the aforementioned configuration, because the relationship expressed by the inequality of D1>W1 is satisfied, an operator may correctly insert the detection lens into the lens holder.

In the aforementioned configuration, the third projection may include a third projection surface which extends from the first projection toward the third intersecting surface to define a third corner together with the third intersecting surface. A relationship expressed by an inequality of D2>W1 may be satisfied, where D2 represents a distance between the second and third corners.

According to the aforementioned configuration, because the relationship expressed by the inequality of D2>W1 is satisfied, an operator may correctly insert the detection lens into the lens holder.

In the aforementioned configuration, the lens unit may further include adhesive applied to at least one of a first adhesion space, which is surrounded by the first projection, the third projection and the wall portion, and a second adhesion space, which is surrounded by the first projection, the fourth projection and the wall portion.

According to the aforementioned configuration, because the adhesive is applied to at least one of the first and second adhesion spaces, the lens unit may have high mechanical strength.

In the aforementioned configuration, the flange portion may include at least one of a curved corner and a chamfered corner.

According to the aforementioned configuration, because the flange portion includes at least one of a curved corner and a chamfered corner, chipping and other damages are less likely happen to the corner.

In the aforementioned configuration, the flange portion may form a tapered shape which tapers toward the lens portion. A relationship expressed by an inequality of $0 \leq W3-Z1 < 0.1$ mm may be satisfied, where Z1 represents a thickness of the flange portion in a direction along the optical axis, and W3 represents a thickness of the first insertion space in a direction along the optical axis.

According to the aforementioned configuration, because the flange portion forms a tapered shape which tapers toward the lens portion, the flange portion may be easily molded with resin. Because the relationship expressed by the inequality of $0 \leq W3-Z1 < 0.1$ mm is satisfied, an operator may very accurately insert the detection lens into the lens holder.

An optical pickup device according to another aspect of the aforementioned embodiments has the lens unit and an optical base configured to support the lens unit. The lens unit is placed on the optical base.

According to the aforementioned configuration, because the optical pickup device has the lens unit placed on the optical base, the optical pickup device may perform information processes accurately.

In the aforementioned configuration, the lens unit may be integrated with the optical base.

According to the aforementioned configuration, because the lens unit is integrated with the optical base, the optical pickup device may perform information processes accurately.

An optical disc device according to another aspect of the embodiments has the optical pickup device, a driver configured to rotate and drive an information recording medium, and a controller configured to control the optical pickup device and the driver.

According to the aforementioned configuration, because the optical disc device has the optical pickup device, the optical disc device may perform information processes accurately.

A computer according to another aspect of the aforementioned embodiments has the optical disc device, an input portion, to which information is input, a computing portion configured to perform computation in response to at least one of reproduced information, which is reproduced from the optical disc device, and input information, which is input through the input portion, and then output an arithmetic result, and an output portion which outputs at least one of the reproduced information, the input information and the arithmetic result.

According to the aforementioned configuration, because the computer has the optical disc device, the computer may perform information processes accurately.

An optical disc player according to another aspect of the embodiments has the optical disc device and an image information generator configured to convert an information signal, which is output from the optical disc device, into image information.

According to the aforementioned configuration, because the optical disc player has the optical disc device, the image information generator may appropriately convert an information signal, which is output from the optical disc device, into image information.

An optical disc recorder according to another aspect of the embodiments has the optical disc device, and an information signal generator to convert image information by means of the optical disc device into an information signal to be recorded.

According to the aforementioned configuration, because the optical disc recorder has the optical disc device, the information signal generator may appropriately convert image information into an information signal to be recorded.

INDUSTRIAL APPLICABILITY

The principles of the various embodiments described above are, in particular, preferably applied to optical discs such as BDs. The principles may contribute to excellent recording and reproduction of information. For instance, a structure of the optical pickup device becomes very simple. Accordingly, the productivity of the optical pickup device may be improved. Consequently, an inexpensive optical disc device may be fabricated. The optical disc devices based on the principles of the various embodiments may be loaded in various devices such as computers, optical disc players and optical disc recorders. These devices may execute recording processes and/or reproduction processes on different types of optical discs. Thus, the principles of the various embodiments may be used for a wide range of application.

The invention claimed is:

1. A detection lens, comprising:
   a lens portion; and
   a flange portion including a first surface, to which the lens portion is connected, and a second surface opposite to the first surface, wherein
   the flange portion includes a base disposed along an optical axis of the lens portion, a first projection, which projects along a first axis orthogonal to the optical axis, a second projection, which is point-symmetric to the first projection around the optical axis and projects from the base, a third projection, which projects along a second axis orthogonal to the optical axis and the first axis, and a fourth projection, which is point-symmetric to the third projection around the optical axis and projects from the base,
   the flange portion does not have a projection which extends beyond the second surface,
   the first projection includes a first intersecting surface which intersects with the first axis,
   the second projection includes a second intersecting surface which intersects with the first axis,
   the third projection includes a third intersecting surface which intersects with the second axis,
   the fourth projection includes a fourth intersecting surface which intersects with the second axis, and
   a first distance between the first and second intersecting surfaces is longer than a second distance between the third and fourth intersecting surfaces.

2. The detection lens according to claim 1, wherein
   the flange portion includes a gate portion which projects from the first or second intersecting surface.

3. The detection lens according to claim 1, wherein
   the lens portion includes a first lens surface which causes astigmatism.

4. The detection lens according to claim 3, wherein
   the first lens surface has a first curvature in a direction along a generatrix of the first lens surface and a second curvature, which is different from the first curvature, in a direction orthogonal to the generatrix.

5. The detection lens according to claim 4, wherein
   the base includes an opposite surface which is opposite to the first lens surface, and
   the opposite surface has a second lens surface of which optical axis is common with the lens portion.

6. A lens unit, comprising:
   the detection lens described in claim 1; and
   a lens holder configured to hold the detection lens, wherein
   the lens holder includes a wall portion defining a first insertion space, into which the flange portion is inserted, and a second insertion space, into which the lens portion is inserted, and
   a relationship expressed by an inequality of $Y1>W1>X1>W2>Da$ is satisfied, where Y1 represents the first distance, X1 represents the second distance, Da represents a width of the lens portion along the first axis, W1 represents a width of the first insertion space along the first axis, and W2 represents a width of the second insertion space along the first axis.

7. A lens unit, comprising:
   the detection lens described in claim 2; and
   a lens holder configured to hold the detection lens, wherein
   the lens holder includes
   a wall portion defining a first insertion space, into which the flange portion is inserted, and a second insertion space, into which the lens portion is inserted,
   a first pedestal, which projects toward the flange portion in the first insertion space, and
   a second pedestal defining a space, into which the gate portion is inserted, together with the first pedestal,
   a relationship expressed by an inequality of $Y1>W1>X1>W2>Da$ is satisfied, where Y1 represents the first distance, X1 represents the second distance, Da represents a width of the lens portion along the first axis, W1 represents a width of the second first insertion space along the first axis, and W2 represents a width of the second insertion space along the first axis,
   the first pedestal includes a first facing surface which faces the gate portion,
   the second pedestal includes a second facing surface which faces the gate portion, and
   a relationship expressed by an inequality of $We>De$ and a relationship expressed by an inequality of $Wh>Dh$ are satisfied, where We represents a distance between the first and second facing surfaces, Wh represents a projection length of the first and second pedestals in the first insertion space, and Dh represents a projection length of the gate portion from the first or second intersecting surface.

8. The lens unit according to claim 7, wherein
   the first projection includes a first projection surface, which extends from the third projection toward the first intersecting surface to define a first corner together with the first intersecting surface,
   the second projection includes a second projection surface, which extends from the fourth projection toward the second intersecting surface to define a second corner together with the second intersecting surface, and
   a relationship expressed by an inequality of $D1>W1$ is satisfied, where D1 represents a distance between the first and second corners.

9. The lens unit according to claim 8, wherein
   the third projection includes a third projection surface, which extends from the first projection toward the third intersecting surface to define a third corner together with the third intersecting surface, and
   a relationship expressed by an inequality of $D2>W1$ is satisfied, where D2 represents a distance between the second and third corners.

10. The lens unit according to claim 6, further comprising adhesive, which is applied to at least one of a first adhesion space, which is surrounded by the first projection, the third projection and the wall portion, and a second adhesion space, which is surrounded by the first projection, the fourth projection and the wall portion.

11. The lens unit according to claim 6, wherein
    the flange portion includes at least one of a curved corner and a chamfered corner.

12. The lens unit according to claim 6, wherein
    the flange portion forms a tapered shape which tapers toward the lens portion, and
    a relationship expressed by an inequality of $0 \leq W3-Z1<0.1$ mm is satisfied, where Z1 represents a thickness of the flange portion in a direction along the optical axis, and W3 represents a thickness of the first insertion space in a direction along the optical axis.

13. An optical pickup device, comprising:
the lens unit described in claim 6; and
an optical base configured to support the lens unit, wherein the lens unit is placed on the optical base.

14. The optical pickup device according to claim 13, wherein
the lens unit is integrated with the optical base.

15. An optical disc device, comprising:
the optical pickup device described in claim 13;
a driver configured to rotate and drive an information recording medium; and
a controller configured to control the optical pickup device and the driver.

16. A computer, comprising:
the optical disc device described in claim 15;
an input portion to which information is input;
a computing portion configured to perform computation in response to at least one of reproduced information, which is reproduced from the optical disc device, and input information, which is input through the input portion and then output an arithmetic result; and
an output portion configured to output at least one of the reproduced information, the input information and the arithmetic result.

17. An optical disc player, comprising:
the optical disc device described in claim 15; and
an image information generator configured to convert an information signal, which is output from the optical disc device, into image information.

18. An optical disc recorder, comprising:
the optical disc device described in claim 15; and
an information signal generator which uses the optical disc device to convert image information into an information signal to be recorded.

\* \* \* \* \*